INVENTORS
JOHN G. HANSEN
JACK R. OAGLEY

July 27, 1965

J. G. HANSEN ETAL 3,196,766

XEROGRAPHIC APPARATUS

Filed Sept. 3, 1963

INVENTOR.
JOHN G. HANSEN
JACK R. OAGLEY

BY

ATTORNEY

July 27, 1965

J. G. HANSEN ETAL 3,196,766

XEROGRAPHIC APPARATUS

Filed Sept. 3, 1963

INVENTOR.
JOHN G. HANSEN
JACK R. OAGLEY

BY

ATTORNEY

July 27, 1965

J. G. HANSEN ETAL 3,196,766

XEROGRAPHIC APPARATUS

Filed Sept. 3, 1963

INVENTOR.
JOHN G. HANSEN
JACK R. OAGLEY

BY

ATTORNEY

July 27, 1965
J. G. HANSEN ETAL
3,196,766
XEROGRAPHIC APPARATUS
Filed Sept. 3, 1963
14 Sheets-Sheet 7
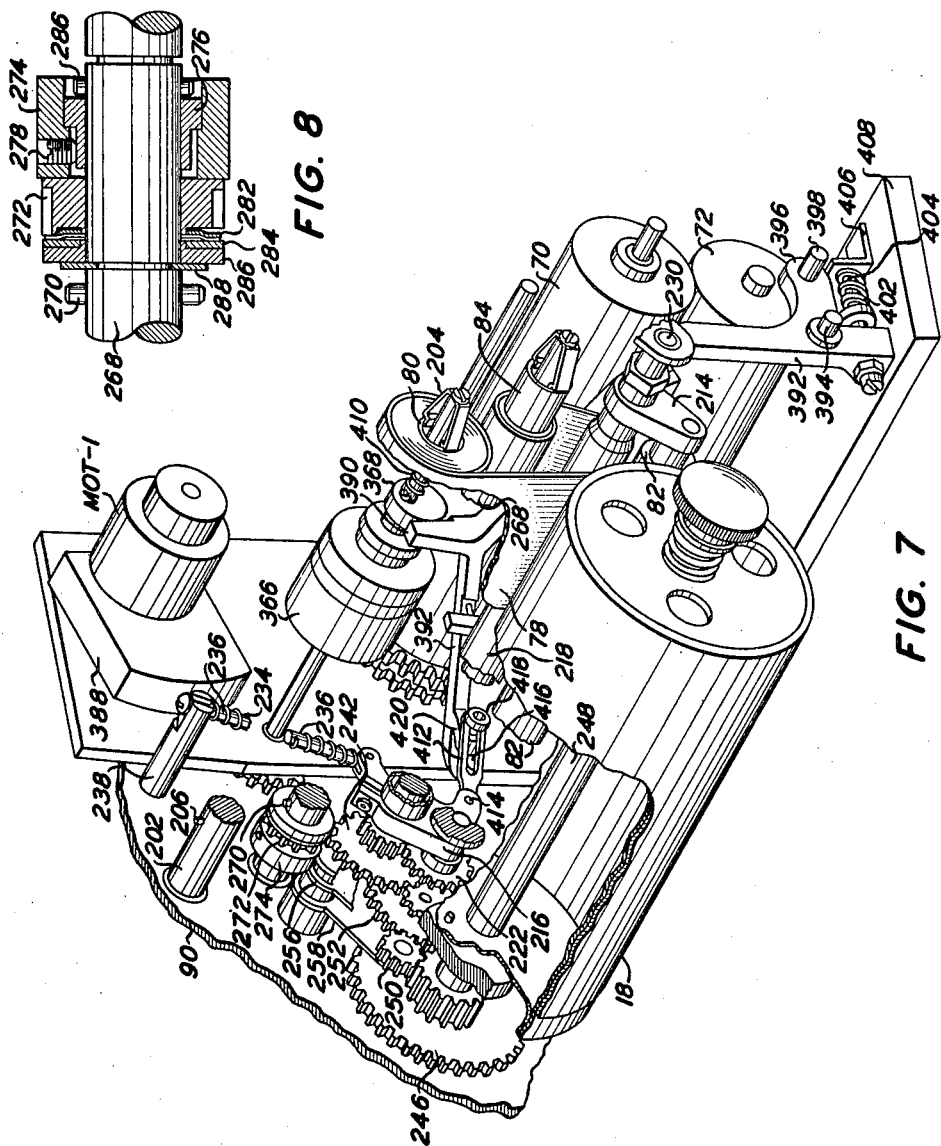
INVENTOR.
JOHN G. HANSEN
JACK R. OAGLEY
BY
ATTORNEY July 27, 1965  J. G. HANSEN ETAL  3,196,766
XEROGRAPHIC APPARATUS Filed Sept. 3, 1963  14 Sheets-Sheet 8

INVENTOR.
JOHN G. HANSEN
JACK R. OAGLEY
BY
ATTORNEY

INVENTOR.
JOHN G. HANSEN
JACK R. OAGLEY
BY
ATTORNEY

INVENTOR.
JOHN G. HANSEN
JACK R. OAGLEY

ATTORNEY

INVENTOR.
JOHN G. HANSEN
JACK R. OAGLEY
ATTORNEY

July 27, 1965     J. G. HANSEN ETAL     3,196,766
XEROGRAPHIC APPARATUS
Filed Sept. 3, 1963     14 Sheets-Sheet 14
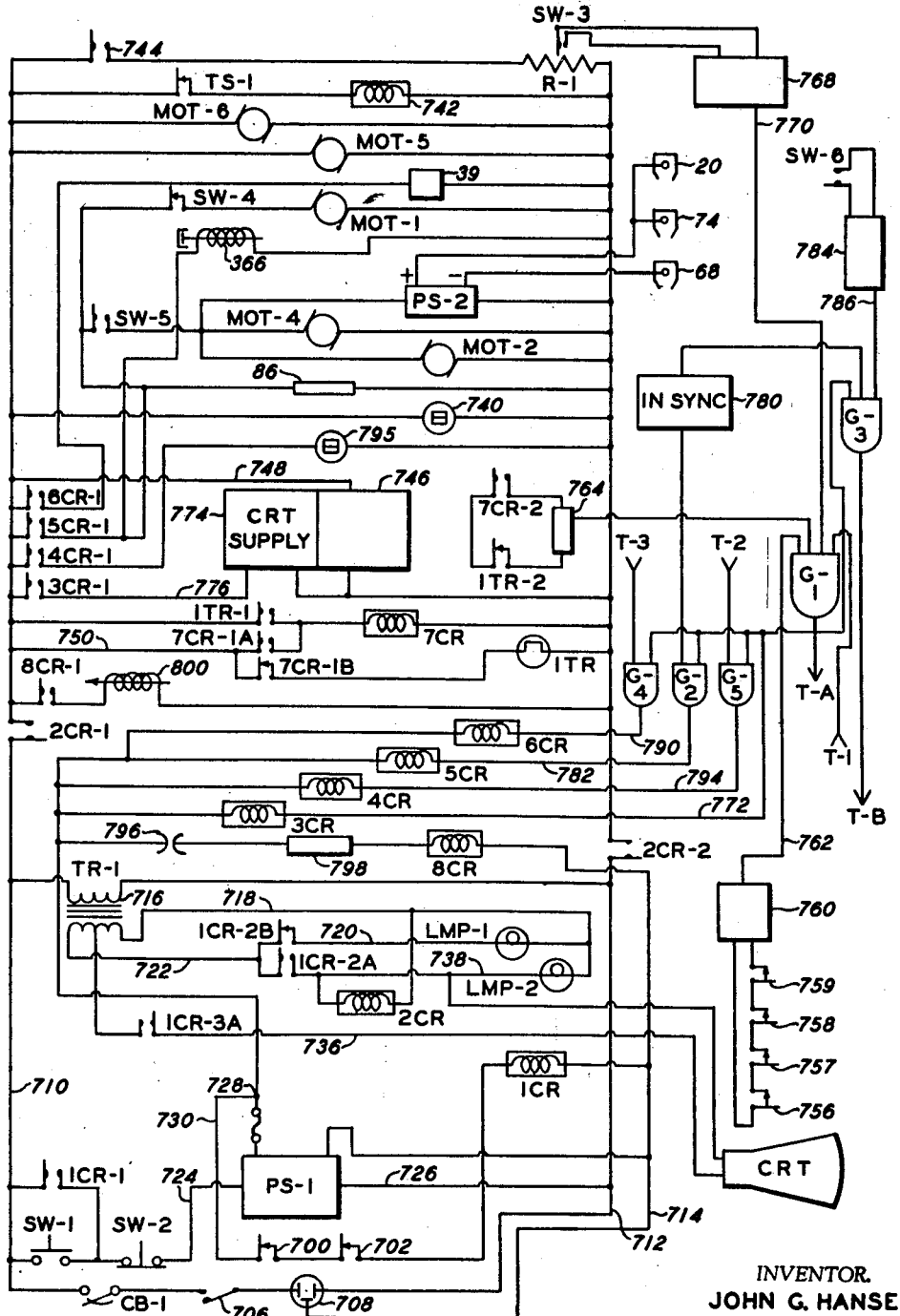
FIG. 15
INVENTOR.
JOHN G. HANSEN
JACK R. OAGLEY
BY 
ATTORNEY United States Patent Office 3,196,766
Patented July 27, 1965

3,196,766
XEROGRAPHIC APPARATUS
John G. Hansen, Pittsford, and Jack R. Oagley, Rochester, N.Y., assignors to Xerox Corporation, Rochester, N.Y., a corporation of New York
Filed Sept. 3, 1963, Ser. No. 305,995
6 Claims. (Cl. 95—1.7)

This invention relates to facsimile recorders and, in particular, to xerographic facsimile recorders.

More specifically, this invention relates to a facsimile recorder wherein an electrical picture signal, produced from a document at a remote location, is received by the facsimile recorder through transmitting facilities, such as common carrier channels, coaxial cables or microwave relay equipment, and is translated into a facsimile of the original document by applying the signal to a cathode ray tube in the optical system of a xerographic reproducing machine.

The increasing need for facsimile reproductions at remote locations has inspired a variety of different approaches to the inherent problems of translating electrical picture signals into a facsimile of the original document. Although there are many approaches to the problems which are operable and there are a number of commercially available systems, each has inherent limitations when considered from the standpoint of high speed, high resolution reproduction. Many of the recording methods are slow and relatively inefficient. The quality of the image reproduced is usually inferior to that of the original document. Most reproduction systems require specially treated paper and usually require an electrical arcing device or electrical current flow, to mark paper or cause chemical changes to develop photographic images on paper. These methods are either very slow or produce poor quality images.

In the process of xerography, as disclosed in either Carlson Patent 2,297,691, issued October 6, 1942, or in Carlson Patent 2,357,809, issued September 12, 1944, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating. The development of the image is effected with developer material or developers which comprise, in general, a mixture of a suitable pigmented or dyed electroscopic powder, hereinafter referred to as a "toner," and a granule of carrier material, which functions to carry and to generate a triboelectric charge on the toner. More exactly, the function of the granule material is to provide the mechanical control to the powder, or to carry the powder to an image surface and, simultaneously, to provide almost complete homogenity of charged polarity. In the development of the image, the toner powder is brought into contact with the plate and is held thereon electrostatically in a pattern corresponding to the electrostatic latent image. Thereafter, the developed xerographic image is usually transferred to a support or transfer material to which it may be fixed by any suitable means.

The process of xerography as disclosed in the above-mentioned Carlson patents provides a solution to the inherent problems of facsimile recording. Rather than exposing the photoconductive surface to a light image of the copy being reproduced, to discharge the uniform electrostatic charge on the photoconductive surface, it is possible to discharge the uniform electrostatic charge in incremental areas by exposing the photoconductive surface to the beam of a cathode ray tube. By controlling the on-off orientation of the cathode ray tube in response to an electric signal received in conformity with the original image on the document being reproduced, an electrostatic image may be generated on the photoconductive surface. A transmitting and receiving system of this type is described in the copending application Serial No. 240,097, filed November 26, 1962, in the names of Charles Huber, John Wheeler, and Elliot Woodhull.

It is the primary object of this invention to improve facsimile recording apparatus to reproduce images of an original document by xerographic means;

It is also an object of this invention to improve xerographic apparatus to reproduce documents in accordance with electrical signals received from a remote location;

It is also an object of this invention to improve facsimile recording apparatus to control the recorder in response to signals received from a remote location and to indicate to a remote location that the recorder is in condition to record electrical signals received.

For a better understanding of the invention, as well as other objects and further features thereof, reference is had to the following detailed description of the invention to be read in connection with the accompanying drawings wherein:

FIG. 7 is a perspective view of the web cleaner and of the fuser apparatus;

FIG. 8 is an enlarged view of the clutch mechanism for the take-up roll of the web cleaner apparatus;

FIG. 15 is a schematic electrical circuit wiring diagram of the apparatus.

*General*

Figure 1:
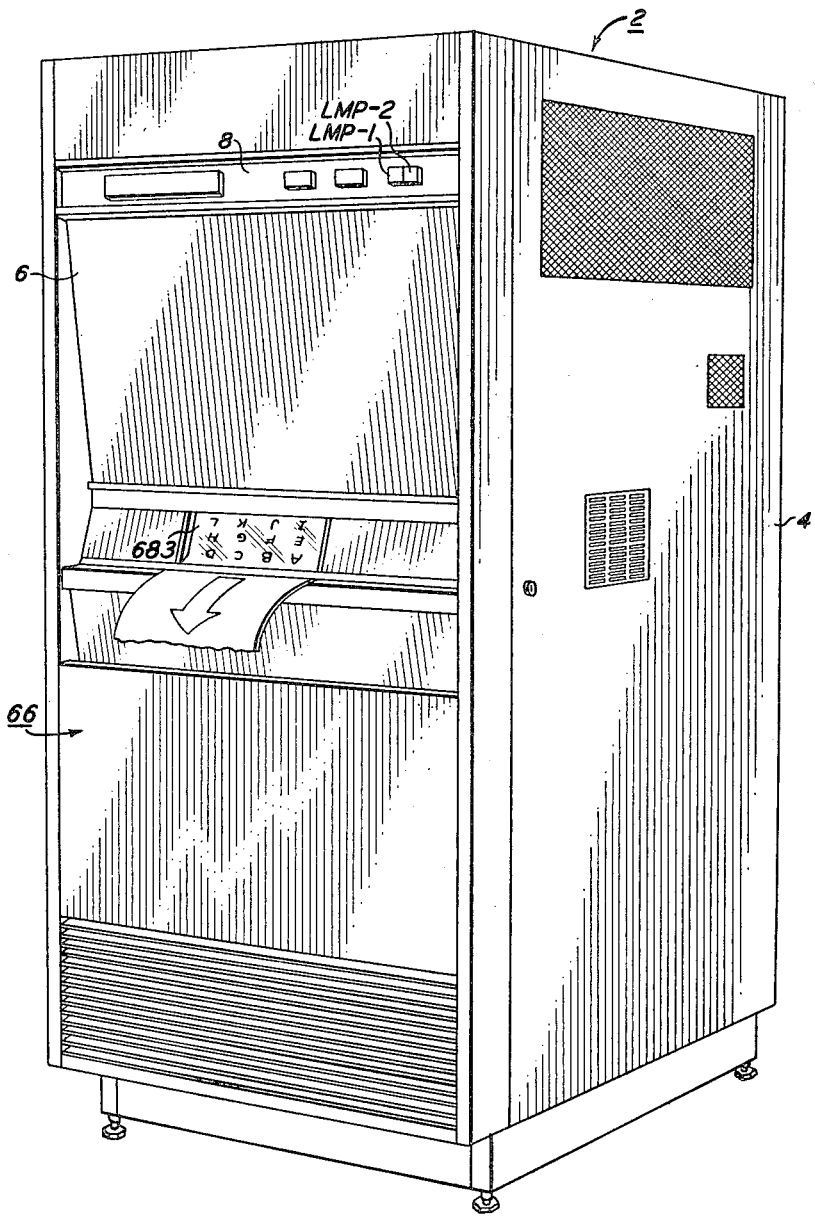
FIG. 1 is a right-hand perspective view of the apparatus of the invention.

FIG. 1 shows the facsimile recorder 2 with side covers 4, a front panel 6, and a display panel 8. The facsimile recorder consists generally of a cathode ray tube 10 which emits a light spot through a lens assembly 12 onto a mirror 14 from which it is reflected to a second mirror 16 onto the surface of a xerographic drum 18. The xerographic drum is suitably journaled in a side frame and rotates in the direction indicated by the arrow to cause the drum surface sequentially to pass a plurality of xerographic processing stations.

For purposes of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which the drum surface is exposed to the sweeping light ray of the cathode ray tube to dissipate the electrostatic charge on the drum surface in the areas exposed to light and to retain the charge in areas that are not exposed to light, thereby forming a latent electrostatic image in conformity with electrical signals controlling the cathode ray tube;

A developing station, at which a xerographic developing material, including toner particles having an electrostatic charge opposite to that of the electrostatic latent image, is cascaded over the drum surface, whereby the toner particles adhere to the electrostatic latent image to form a xerographic powder image in the configuration of the electrostatic latent image produced by the light spot from the cathode ray tube;

A transfer station, at which the xerographic powder image is electrostatically transferred from the drum surface to a transfer material or a support surface; and A drum cleaning station, at which the drum surface is first charged with an electrostatic charge and then brushed or wiped to remove residual toner particles remaining thereon after image transfer, and at which the drum surface is exposed to a relatively bright light source to effect substantially complete discharge of any residual electrostatic charge remaining thereon.

The charging station is preferably located, as indicated by reference character A in the schematic illustration of the apparatus. In general, a charging apparatus or corona charging device 20 includes a corona discharge array of one or more discharge electrodes that extend transversely across the drum and are energized from a high potential source and are substantially enclosed within a shielding member.

Next subsequent thereto in the path of movement of the xerographic drum is an exposure station B. This exposure station consists of the mirror 16 pivotally mounted at an angle to deflect light rays onto the xerographic drum through a slotted light shield 22. The light shield is adapted to protect the xerographic plate from extraneous light. The slotted aperture 24 in the light shield extends transversely to the path of movement of the light receiving surface of the xerographic drum to permit the light rays from the cathode ray tube 10 to be directed against a transverse incremental area of the light receiving surface as it passes under the shield 22.

Figure 4:
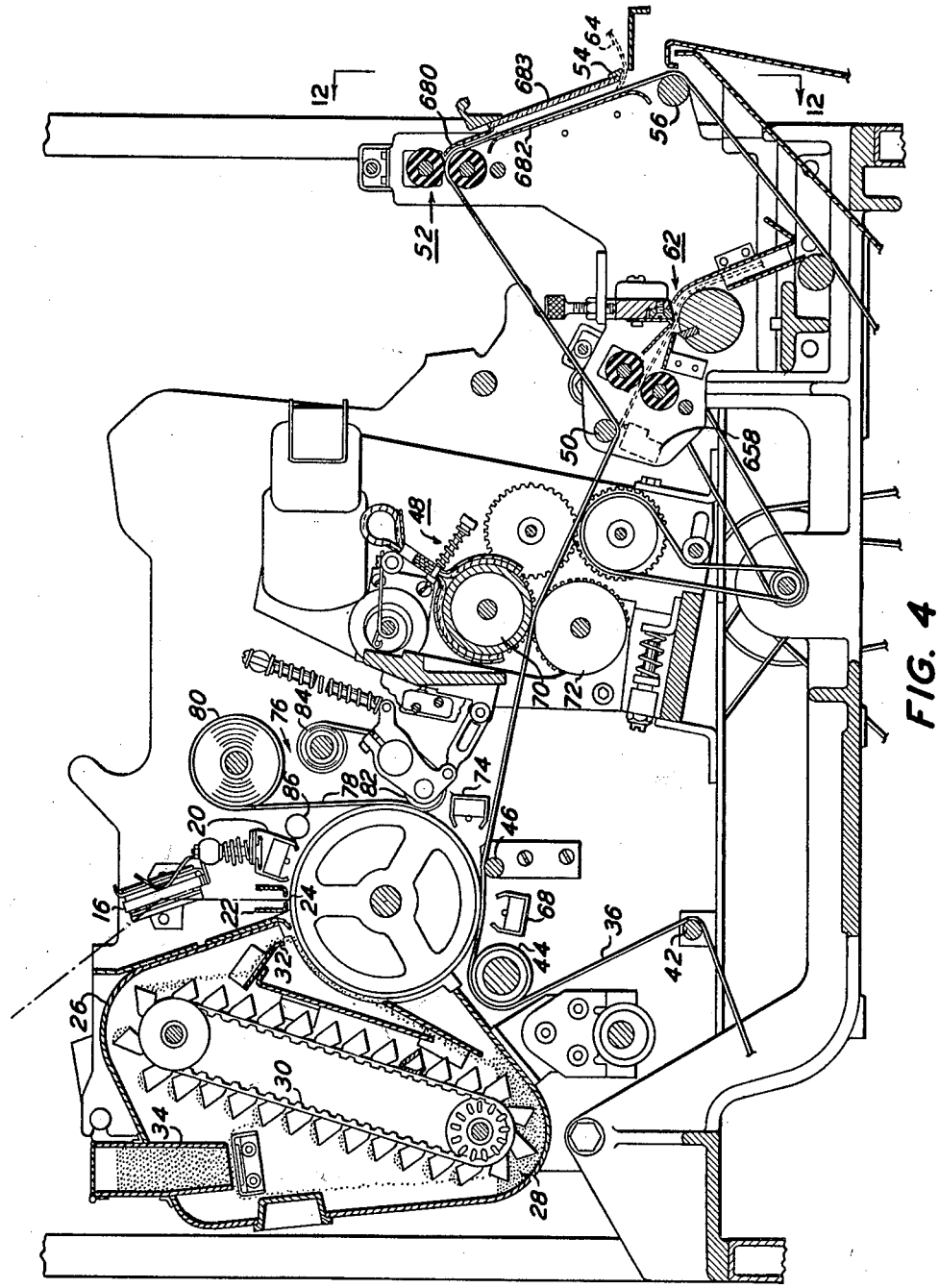
FIG. 4 is a sectional view of the xerographic apparatus taken along lines 4—4 of FIG. 3.

Adjacent to the exposure station is a developing station C in which there is positioned a developer apparatus 26 including a developer housing, shown in FIG. 4, having a lower or sump portion for accumulating developer material 28. Mounted within the developer housing is a driven bucket type conveyor 30 used to carry the developer material to the upper portion of the developer housing from where it is cascaded over a hopper chute 32 onto the drum surface.

As the developer material cascades over the drum, toner particles of the developer material adhere electrostatically to the previously formed electrostatic latent image areas on the drum to form a visible xerographic powder image. The developer material containing the remaining developer powder falls off the peripheral surface of the drum into the bottom of the developer housing. Toner particles consumed during the developing operation are replenished by a toner dispenser 34, of the type disclosed in copending application Serial No. 776,976, filed November 28, 1958, in the name of Robert A. Hunt, mounted within the developer housing.

Figure 2:
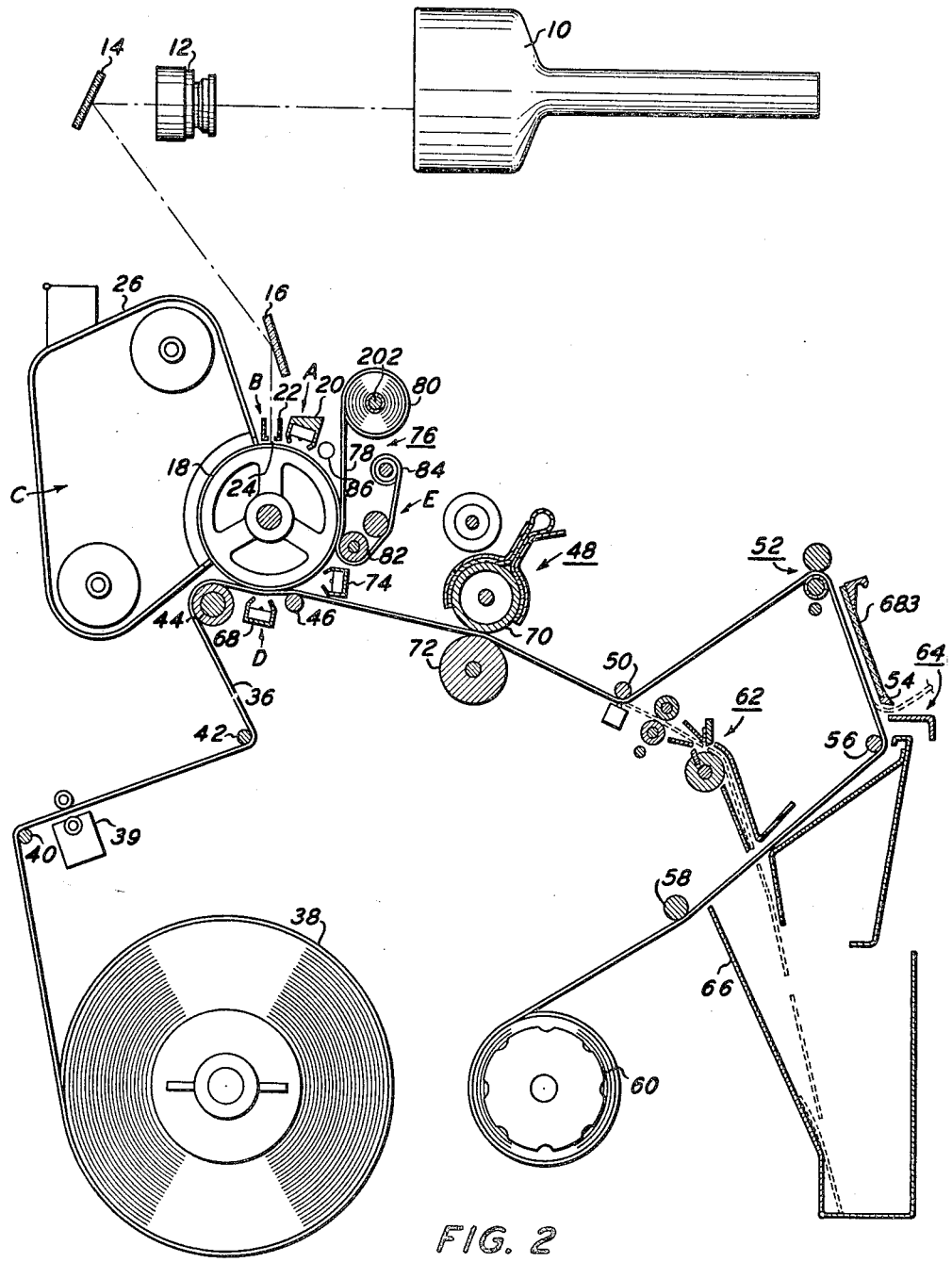
FIG. 2 is a schematic illustration of the apparatus of the invention.

Positioned next adjacent to the developer station is the image transfer station D. At the image transfer station a support material 36, herein shown as a web of paper, is fed from a supply roll 38 around a pair of idler rollers 40 and 42 to a second pair of rollers 44 and 46 adjacent to the xerographic drum so that the web of paper is brought into contact with the drum surface. The web of paper then continues through a xerographic fuser, indicated generally as 48, around a roller 50, through a pair of driving pinch rollers 52 to either a tear bar 54 or around a pair of guide rollers 56 and 58 at feed-out station 64 to a take-up roll 60. Alternatively, the web may pass through a paper cutter, generally indicated as 62, at feed-out station 64 and drop as out-sheets in a bin 66. The web path for paper cutter and tear bar are shown in dotted lines in FIG. 2.

The transfer of the xerographic powder image from the drum surface to the support material is effected by means of a corona transfer device 68 which is located at, or immediately after, the point of contact between the support material and the rotating xerographic drum. The corona transfer device 68 is substantially similar to the corona discharge device that is employed at the charging station in that it also includes an array of one or more corona discharge electrodes that are energized from a suitable high potential source and extend transversely across the drum surface and are substantially enclosed with a shielding member. In operation, the electrostatic field created by the corona transfer device is effective to tack the transfer material electrostatically to the drum surface and, simultaneously with the tacking action, the electrostatic field is effective to attract the toner particles comprising the xerographic powder images from the drum surface and cause them to adhere electrostatically to the surface of the support material.

As the web of material moves forward away from the xerographic drum, there exists on the surface of the support material a powder image so that as the web passes between the rollers 70 and 72 of the fuser 48, the powder image is fused onto the surface of the support material and is permanently fixed thereto.

The next and final station in the device is a drum cleaning station E whereat any powder remaining on the xerographic drum after the transfer step is removed and whereat the xerographic drum is flooded with light to cause dissipation of any residual electric charging remaining thereon.

To aid in the removal of any residual powder remaining on the drum surface, there is provided a corona precleaning device 74 that is substantially similar to the corona discharge device that is employed at charging station A. Removal of residual powder from the xerographic drum is effected by means of a web cleaning device 76 adapted to continuously feed a clean fibrous web of material into wiping contact with the xerographic drum. As shown, the web material 78 is taken from a supply roll 80 and transported around a cleaning or pressure roll 82, preferably made of rubber, onto a take-up or rewind roll 84.

Any residual electrical charge remaining on the xerographic drum is dissipated by light from a fluorescent lamp 86 mounted in a suitable bracket above the xerographic drum, a suitable starter and ballast being provided for energizing the fluroescent lamp.

Suitable drive means, described below, drive the xerographic drum, the drive rolls for the web of support material, the fuser, and a web cleaner mechanism, the latter being driven at a speed, or speeds, whereby relative movement between the xerographic drum and the web material is effected. Suitable drive means are also provided for effecting operation of the conveyor mechanism and the toner dispenser of the developing apparatus assembly.

Figure 3:
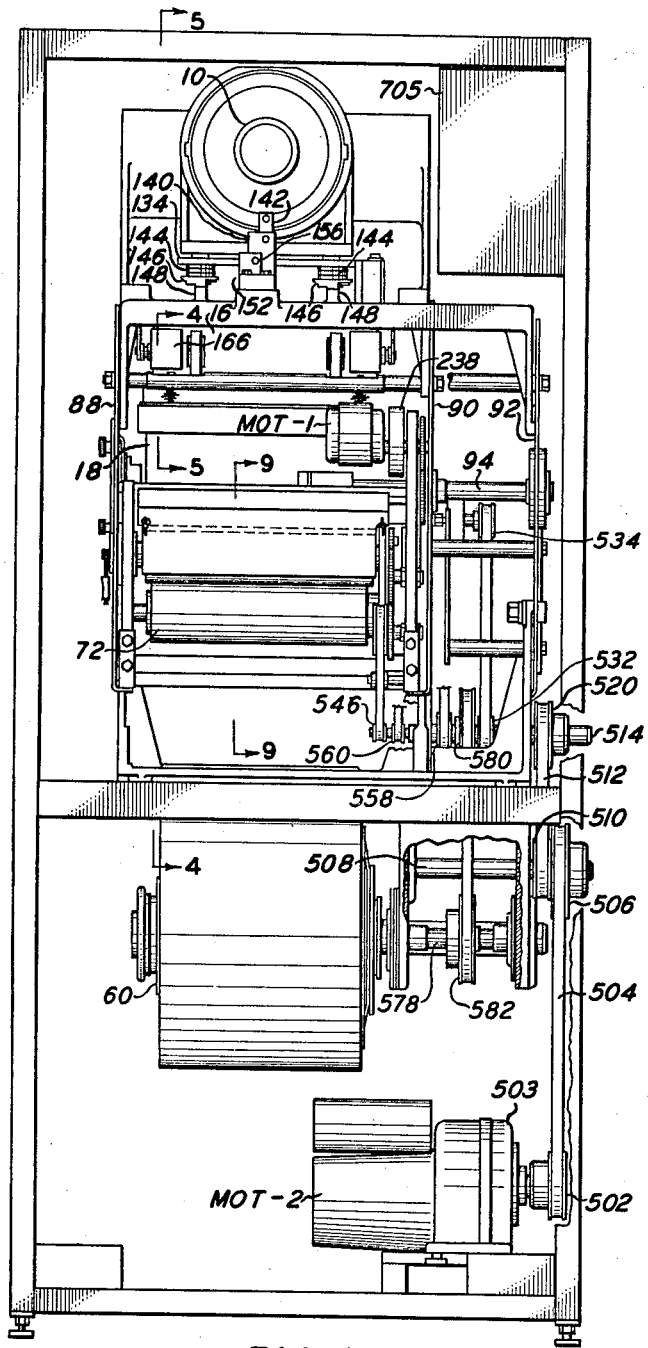
FIG. 3 is a front view of the apparatus taken with the cabinet covers removed and with the paper cutter removed to show the internal structure of the apparatus.

As seen in FIG. 3, there is provided a frame for supporting the components of the apparatus formed by a left-hand plate 88, an intermediate plate 90, and a right-hand plate 92 connected together and maintained rigidly in spaced relation to each other by suitable tie rods.

The xerographic drum 18 having a layer of photoconductive insulating material on a conductive backing, is mounted on a horizontal driven shaft 94 that rotates in bearings mounted in plates 90 and 92. The drum is mounted on shaft 94 in cantilever fashion and the free end is threaded to receive a nut to retain the drum on the shaft.

Optical system

Electrical signals, received from a remote source, are used to control the exposure of the xerographic drum to light. Thus, the electrical signal is basically used to construct an electrostatic latent image on the drum surface. The optical system must, therefore, use a source of light responsive to electrical signals, herein a cathode ray tube. The cathode ray tube 10 is mounted inside the machine with the appropriate electronic apparatus, not shown, required to convert the electrical signal into a light ray. The type of electronic apparatus required for the operation of a cathode ray tube is well known in the art and does not constitute part of the present invention. However, an example of the type of system that may be used is disclosed in the above-mentioned copending application of Charles L. Huber et al., Serial No. 240,097, filed November 26, 1962.

Figure 5:
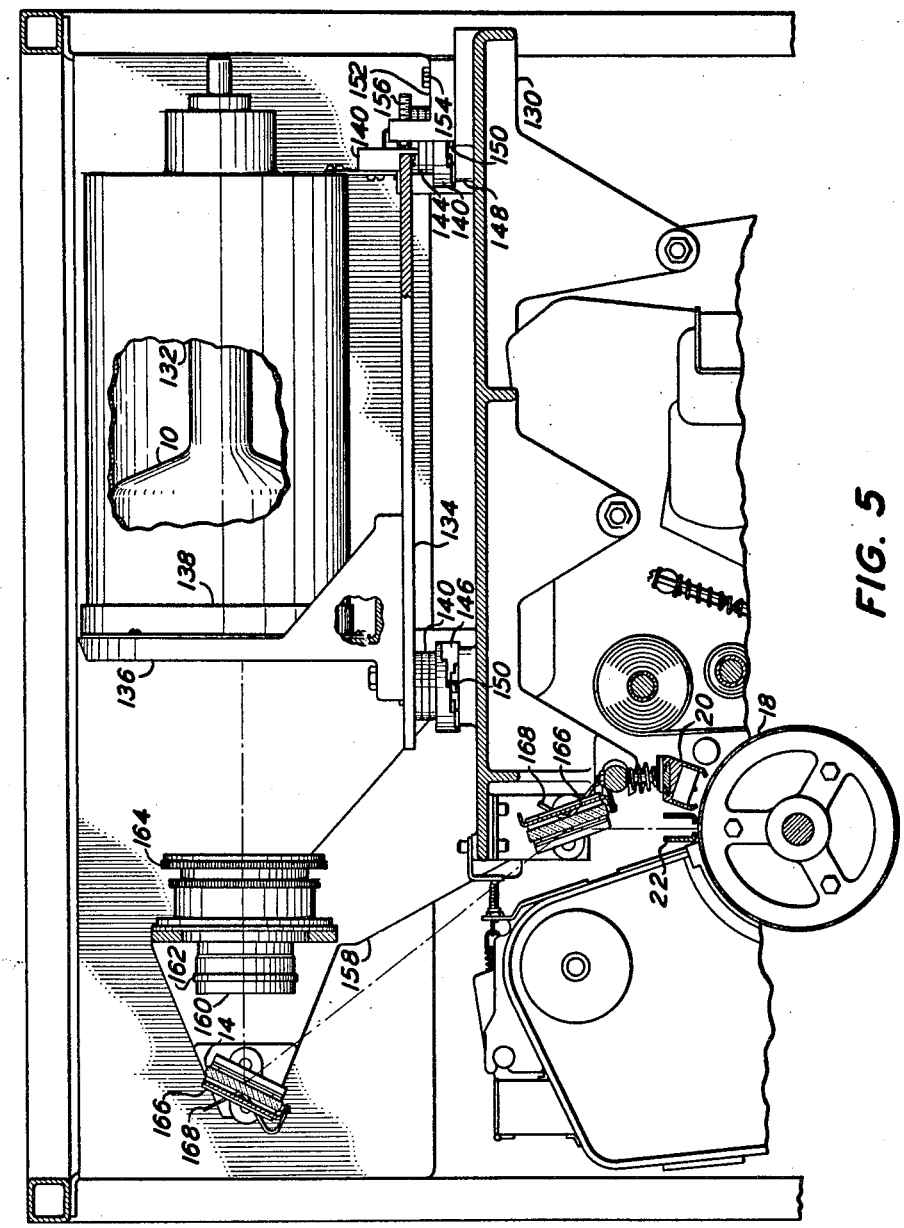
FIG. 5 is a sectional view of the optic system taken along lines 5—5 of FIG. 3 with portions broken away to show internal structure.

Referring to FIG. 5, an optical casting 130 supports the entire optical assembly. The cathode ray tube 10 is mounted within a container 132 which is supported on support plate 134 by bracket 136 and support ring 138 at one end. and at the other end by block 140 and connector 142. The support plate 134 is adjustably mounted on the optical casting 130 so that the cathode ray tube may be raised or lowered to change the relative position of the light spot on the tube face. The light spot scans a straight line across the face of the tube and, after extended usage, produces burn-out of the phosphor on the face of the tube along the scan line. In such event, the vertical deflection of the spot may be adjusted to scan a new line on the tube face and the tube may be physically adjusted so that the new scan line is in the same relative position to the rest of the optic system as the original scan line.

For purposes of physical adjustment of the cathode ray tube, the support plate 134 is mounted upon a set of shims 144 resting on adjustment blocks 146 which are supported upon a pair of bosses 148 on the optical casting 130, as seen in FIGS. 3 and 5. The support plate is fastened through the shims 144 and the adjusting blocks 146 to the optical casting 130 by means of screws 150. There is an adjustment assembly as just described in each of the four corners of the support plate 134. The adjustment blocks contain stepped thicknesses such that as the blocks are rotated a different level of thickness is presented to the boss 148 varying the height of the support plate and the cathode ray tube above the optical casting 130. This produces a fine adjustment of the cathode ray tube. The shims 144 may either be added or removed to provide further adjustments beyond the range of the steps in the adjustment blocks.

At the rear of the cathode ray tube, the front of the recorder, there is located a lateral or horizontal adjustment assembly for the cathode ray tube. An adjustment block 152 is secured to the optical casting 130 by bolt 154 and contains set screw 156 which bears against the support block 140 and the end of the support plate. Adjustment of the set screw 156 will produce horizontal movement of the support plate 134.

A lens system support bracket 158 is secured to the optical casting 130 and supports the lens system 12 and the mirror 14. The lens system 12 consists of a lens 160 mounted in a lens barrel 162 which is adjustable by rotation of outer barrel 164. The mirror 14 is a front surface mirror and is held in a bracket 166 by leaf spring 168. The bracket 166 is pivotally secured to the frame member 158 by conventional ball and socket joints on each end, not shown, and has tightening means to lock the ball and socket joints and prevent movement of the mirror.

A second mirror 16 is mounted and supported above the xerographic drum at the light shield 22 by the same type of bracket and leaf spring arrangement described for the mirror 14. The light spot from the cathode ray tube passes through the lens 160 onto the surface of the mirror 14 where it is reflected downward onto the surface of the mirror 16 from which point it is reflected through the light shield 22 onto the surface of the xerographic drum. The light spot is moved across the surface of the face of the cathode ray tube and, ultimately, in lines across the surface of the xerographic drum. That is, the light spot scans the surface of the xerographic drum in a series of lines parallel to the axis of the drum. The on-off orientation of the light spot is controlled by the incoming electrical signal and effects discharge of an electrostatic charge on the drum surface in accordance with the electrical signals received.

Drum cleaning assembly

After transfer of a powder image from the drum surface to the web or support material, it is necessary to clean the residual powder from the drum before making a new image on the drum. To remove the residual powder after transfer, there is provided a drum cleaning assembly. Also to dissipate any residual electric charge remaining on the drum a light source is used to flood the portions of the xerographic drum with light as it passes through the cleaning station.

Referring to FIGS. 7 through 10, the drum cleaning assembly is shown as containing a web cleaner 76, which includes a supply roll 80, preferably formed as a disposable cardboard cylinder, carried on a supply roll shaft 202 journaled in frame plates 90 and 92. The supply roll is held on the supply roll shaft by means of a spring snap retainer 204 secured to the free end of the shaft, the slotted end of the supply roll engaging the pin 206 in the shaft. As the web of material 78 is pulled from the supply roll, the shaft 202 must be rotated, thereby imparting a slight resistance to the unwinding of the web material from the supply roll.

The web material 78 is brought into cleaning contact with the drum surface by cleaning or pressure roll 82, preferably made of rubber, bonded to a support cylinder 208. cylinder 208 is supported at opposite ends by stub shafts 210 and 212 journaled in yokes 214 and 216, respectively, fastened in spaced apart relation to each other on a torque tube 218. The cleaning or pressure roll is driven by pin 420 on the end of stub shaft 212 engaging the notched end of cylinder 208, a driven gear 222 being fixed to the opposite end of the stub shaft.

The torque tube 218 is rotatably supported on yoke shaft 224, which is fastened at one end by set screw 426 in support 428, secured to frame plate 90. At its output end, the torque tube is journaled on tapered pin 430 in support arm 432 pivotally mounted to frame plate 88. Support arm 432 is normally biased into position to support the output end of torque tube 218 by means of a coiled spring, not shown.

The torque tube 218 supports the yokes 214 and 216 which, in turn, carry the cleaning or pressure roll 82. Thus, the pressure roll 82 may be rotated on the yokes 214 and 216 about the center of the torque tube 218 from a cleaning position, as shown in FIG. 7, with the peripheral surface of the roller against the outer surface of the xerographic drum with the web of material sandwiched therebetween to a second position in which the cleaning roll is in an inoperative position away from the surface of the xerographic drum. The purpose for moving the pressure roll away from the surface of the xerographic drum is twofold. First, it is necessary that the web material be placed between the pressure roll and the drum surface so that when a new web is placed upon the supply roll the pressure roll may be swung away from the drum to allow the web to be placed between the pressure roll and the drum surface and attached to the takeup roll. Secondly, the drum has a continuous layer of photoconductive material on the surface thereof and when the machine is not in operation, if the pressure roll is pressing against the drum at one spot, the photoconductive surface would be damaged in that area producing irregularities in the copies produced in that area. Therefore, when the machine is not running, the compression roll is swung away from the drum surface by means described below.

The cleaning roll is biased into pressure contact with the peripheral surface of the xerographic drum by means of compression spring 234. The compression spring encircles a spring guide 236 which serves as a link extending radially from a shaft 238 journaled in frame plates 90 and 92 to the yoke 216.

One end portion of the compression spring engages the shoulder on the lower end of spring guide 236 and the opposite end portion of the compression spring engages the shaft 238. The guide 236 is movably mounted at one end in a suitable opening in shaft 238 and its movement in one direction is limited by washer head screw 240, adjustably threaded into the end of the guide. With this arrangement, the axis of the cleaning roll is biased by the compression spring 234 to a fixed position relative to the peripheral surface of the xerographic drum as determined by the washer head screw. The normal forces supplied by the cleaning roll against the xerographic drum surface with the web material sandwiched therebetween is dependent upon the spring rate or deflection of the material of the cleaning roller and the position of the axis of the cleaning roller relative to the xerographic drum as determined by the washer head screw 240 acting as a stop or guide 236. It has been found that effective cleaning is obtained when the normal forces of the pressure or cleaning roll against the xerographic drum with the web mateiral therebetween is in the range of ten to thirty pounds, preferably twenty pounds.

The guide 236 and the compression spring act as an overriding linkage permitting the compression spring to either bias the cleaning roll against the peripheral surface of the drum, that is, to bias the axis of the cleaning roll to a fixed position when in its operative position, or to bias the cleaning roll away from the drum to its inoperative position.

The cleaning roll 82 is rotated by gear 222 on stub shaft 212, engaging the compound gear 242 journaled on yoke shaft 224. Axial alignment of this gear is maintained by spacer 244. Compound gear 242, in turn, is driven by compound gear 246 on the drum shaft 248 through pinion gear 250 in compound gear 252. Pinion gear 250 and compound gear 252 are mounted on stub shafts 254 journaled in front support plate 256 and rear support plate 258.

A switch bracket 260, front support plate 256 and rear support plate 258 are mounted on studs 262 secured to support 228. The switch bracket is maintained in spaced relation to the front support plate by spacers 264 and the front support plate is held in spaced relation to the rear support plate by spacers 266.

The take-up roll 84, preferably formed as a disposable cardboard cylinder similar to supply roll 80, is positioned on take-up shaft 268 by a spring snap retainer 204 secured to the free end of the shaft, the slotted end of the take-up roll engaging the pin 270 in shaft 268.

The take-up shaft 268, journaled in the frame plates 90 and 92, is driven by compound gear 252 and driving gear 272 journaled on the shaft through a slip clutch arrangement in which the end face of gear 272 adjacent the torque nut 274 serves as one clutch element coacting with the second clutch element or torque nut 274 adjustably positioned on the shaft by torque screw 276 and set screw 278. This assembly is secured against rotation relative to the take-up shaft by engagement of a radial pin 280 carried by the shaft and in a slot provided in the torque screw.

In order to provide means for applying the required pressure to the coacting clutch elements, gear 272 and torque nut 274, and annular spring 282 encircles the shaft between the gear 272 and thrust washers 284 and 286 retained by snap ring 288 positioned in a suitable groove formed on the take-up shaft.

The torque nut 274 is adjusted on the torque screw so that the force supplied by the annular spring 284 is sufficient to permit the gear 272 to drive the take-up shaft through the torque nut to rewind the web material onto the take-up roll as it is advanced by the cleaning roll in cooperation with the drum surface, while still permitting the clutch elements to slip relative to each other whereby the desired range of tension on the web material is maintained. In this manner, the web material is advanced only by the action of the cleaning roll and not by the take-up roll.

With this arrangement, the web material is advanced by the cleaning roll at a speed relative to the lineal speed of the drum surface whereby the web material will wipe the residual powder that may remain on the xerographic plate after the transfer process.

When the machine is not in operation, the pressure roll 82 is withdrawn from contact with the drum 18 by pivoting the yokes 214 and 216 about torque tube 218 to prevent damage to the drum surface by the pressure that would be exerted on one spot of the drum surface during shutdown periods. The mechanism to effect movement of the pressure roll away from the drum surface works in conjunction with the operation of the fuser 48 and is described below thereunder.

*Fuser*

As previously described, a powder image is developed on the xerographic drum and transferred to the web of support material 36, usually paper, and must be fused or bonded thereto to produce permanency of the reproduced copy. The toner or powder used is usually a pigmented thermoplastic resin, a number of which are manufactured and marketed by Xerox Corporation of Rochester, New York, and are specifically compounded for producing dense images of high resolution and to have characteristics to permit convenient storage and handling. The individual particles of resin (toner) soften and coalesce when heated so that they become sticky or tackified and readily adhere to the surface of the transfer material.

The term "tackified" and the several variant forms thereof used throughout this specification are employed to define the condition of the powder particles of the xerographic powder image when heated in a manner such that the individual particles soften and coalesce and in which state they become sticky and readily adhere to other surfaces. Although this condition necessarily requires a flowing together of the particles to effect a thorough fusion thereof, it is to be understood that the extent of such flowing is not sufficient to extend beyond the boundary of the pattern in which the particles are formed.

The support material used is usually paper, as shown for the preferred embodiment disclosed herein by web 36, and is capable of having the resinous powder bonded thereto by heat fusing. In order to fuse resinous powder images formed by the powder resins now commonly used, it is necessary to heat the powder and the paper to which it is to be fused to a relatively high temperature, such as approximately 250° F. to 270° F. It is undesirable, however, to raise the temperature of the paper substantially higher than 375° F. because of the tendency of the paper to discolor at such elevated temperatures.

The fuser disclosed herein is a direct contact fusing device in which the toner image is fused by forwarding the web of paper bearing the toner image between the two rolls 70 and 72, the roll 70 contacting the image being provided with a thin coating of a Du Pont Corporation product composed of tetrafluoroethylene resin sold under the trademark Teflon, and a silicon oil film to prevent toner from adhering to the roll. Both the Teflon and the silicon oil have such phyical characteristics that they are highly repellant to sticky or tacky substances. The Teflon is a chemically inert, non-porous and non-absorbent, relatively hard and generally form-retaining wax-like synthetic resin which is slightly elastic under low stress and which is capable of cold-flowing under greater stress and which is capable of sliding over a surface.

Figure 9:
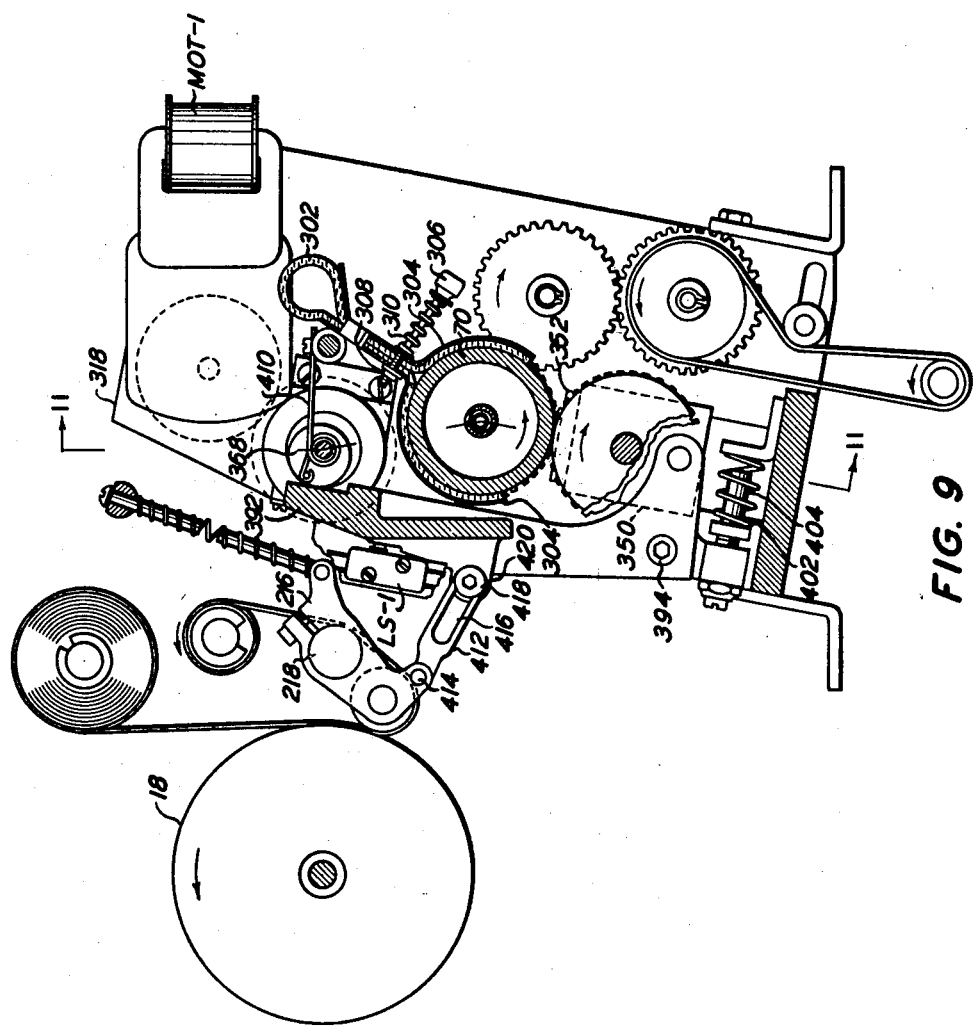
FIG. 9 is a left-hand sectional view of the web cleaner and the fuser apparatus taken along lines 9—9 of FIGURE 3.
Figure 10:
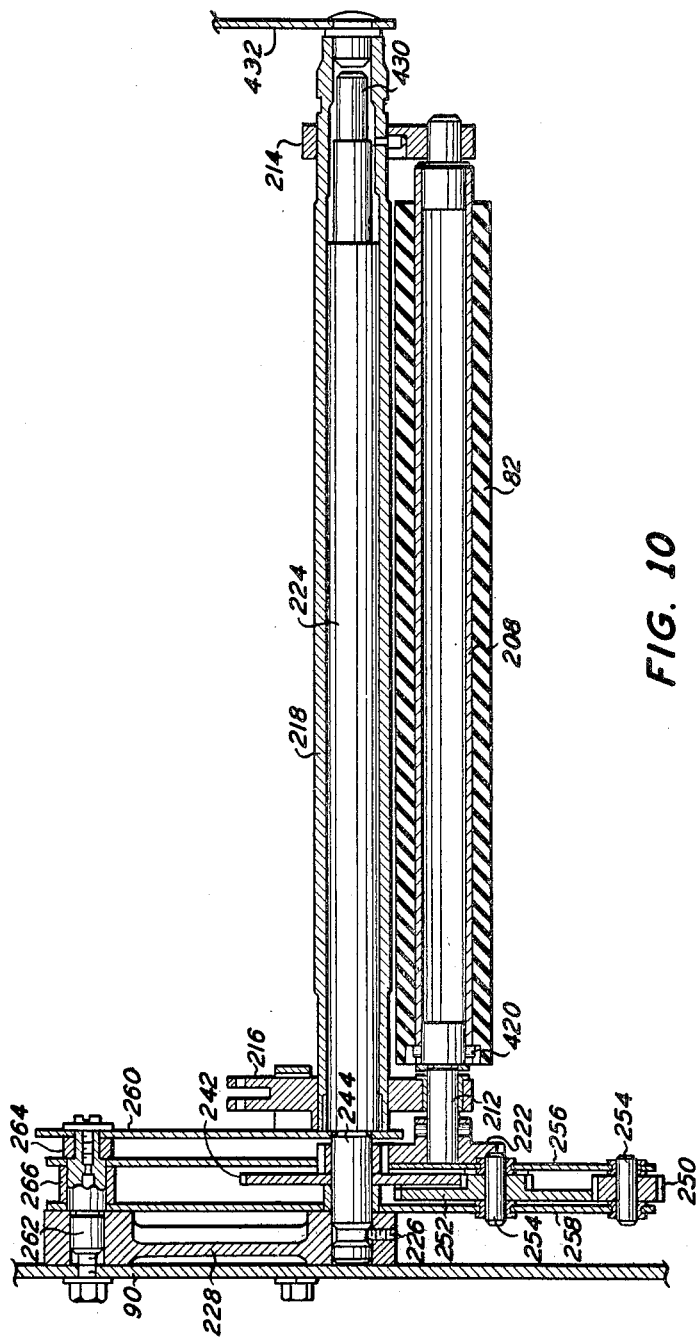
FIG. 10 is a sectional view of the web cleaning roll drive mechanism of the web cleaner apparatus.

The silicon oil is applied to the surface of roller 70 in a thin film to further prevent the toner from adhering to the surface of the roller. As seen in FIG. 9, a felt pad 302 extends around a portion of the surface of roller 70 which does not come in contact with the paper and extends upward to form a loop above the roller which acts as a reservoir for the silicon oil. The felt pad 302 is held in contact with the surface of the roller 70 by means of a pair of thin plates 304 shaped with an internal configuration to fit the outer surface of the roller and to have a portion extending above the roller to be clamped together by means of a screw 306 extending through the extended portion of the plates 304 and nut 308. The spring 310, around the shaft of screw 306, presses against the head of screw 306 and one of the plates 304 so that the pressure of the plates 304 on the felt pad 302 remains fairly constant and the pressure of the felt pad against the surface of the roller 70 also remains constant despite variation in the thickness of the felt pad or in the amount of oil remaining in the felt pad after usage.

The felt pad 302 is initially dipped and soaked in silicon oil so that as the roller 70 rotates inside the felt pad a thin film of the silicon oil is deposited on the surface of the roller. As the oil is depleted from the felt pad in the area around the roller, additional oil will seep down from the loop or reservoir above the roller. After extended operation of the apparatus, additional silicon oil may be applied to the loop of the felt pad 302 or the entire pad may be removed and resoaked in silicon oil, or a new pad inserted.

Figure 11:
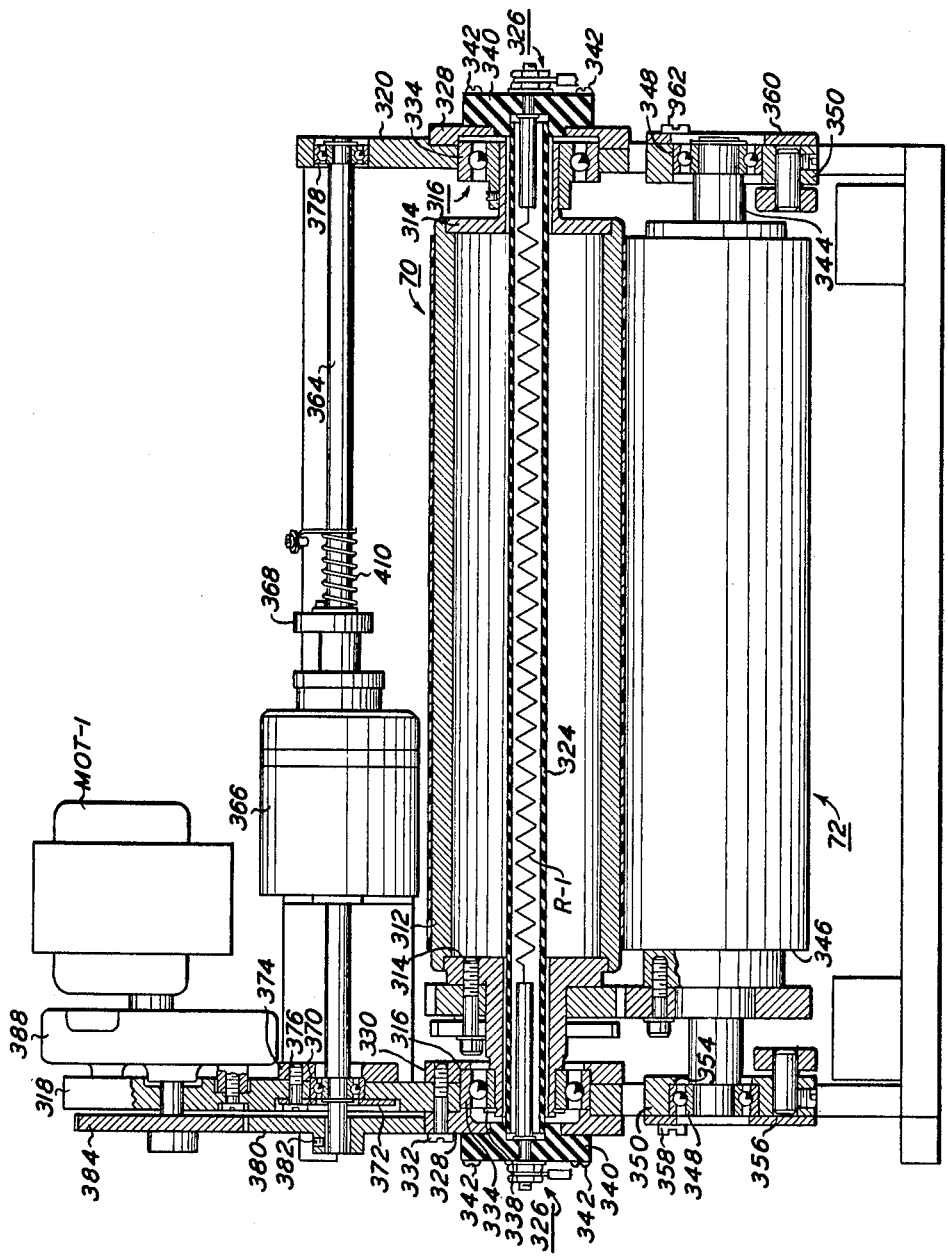
FIG. 11 is a front sectional view of the fuser apparatus taken along lines 11—11 of FIG. 9.

The heated roller 70 consists of a cylinder 312 inside the Teflon cover. The cylinder is closed at opposite ends by fuser roll caps 314, as seen in FIG. 11, which are secured to the cylinder as by a press fit. A spindle portion of the fuser roll caps are journaled for rotation in bearings 316 mounted in plates 318 and 320. Insulated caps 340 are provided to support a quartz tube 324 which contains a suitable resistance heating element R1. The resistance element R1 is connected by suitable conductors to a source of power, such as a commercial 120 volt, 60 cycle, alternating current outlet by connections 326. Two thermostats (not shown) are positioned in close proximity to the outer surface of the heated roller 70. One thermostat controls the power to the resistance element R1 and, thus, the temperature of the roller, and the second thermostat is responsive to a minimum temperature of the roller and is included in the electrical circuitry to produce a signal indicating that the fuser is up to its minimum temperature and a signal may be sent to start the reproducing processes. This latter thermostat is described below under the operation of the machine. In series with the second thermostat there is included a fusible link, as a safety element, which will open the circuit in case of extreme over-heating.

The left end of the heated roller 70, as seen in FIG. 11, is held secure in plate 318 by means of an annular bearing cap 328 and an inner annular bearing retainer 330, which are held together against plate 318 by means of screw 332. The cap 328 and the retainer 330 hold the outer race 334 of the bearing 316 in a fixed position. The one end of the inner race 336 of the bearing 316 abuts against a shoulder of the roller cap 314 and the outer edge of the race 336 is held in position by a snap ring 338. At the opposite, or right-hand end of the roller 70, there is also an outer annular bearing cap 328, which is fastened to side plate 320, but which does not contact the outer race 334, thus allowing for expansion of the heated roller and lateral movement of the bearing 316. At each end of the roller there is an insulated cap 340 fastened to the bearing caps 328 by screws 342 and supporting the electrical connections to the resistance element R1 with suitable connections to a source of power at 326.

The pressure roller 72 consists of a metal inner roller in an outer covering of suitable high temperature rubber 346 adapted to be pressed against the heated roller 70 and to force the paper web 36 into intimate surface contact with the roller 70. The pressure between the rollers 70 and 72 is such as to provide approximately one-quarter inch of surface contact between the two rollers over the length of the rollers. In the embodiment shown, the pressure between the two rollers is approximately forty-five pounds and is produced in a manner described below.

The pressure roller 72 is journaled in a pair of gibs 350 which ride in slots 352 in the side plates 318 and 320. The gibs 350 contain ball bearings 348 which support the shaft 344 of the pressure roller 72 for rotation therein. The outer race of ball bearing 348 on the left-hand side of shaft 344 is held secure by an inner annular lip 354 on gib 350, and the inner race abuts a shoulder on the shaft 344. The outer edges of the races of bearing 348 are held in position by bearing cap 356 secured to gib 350 by screws 358. The bearing cap 356 extends beyond the edges of the gib 350, as seen in FIG. 9, to provide an overlap on plate 318 and provide a sliding surface to retain the gib 350 in the slot 352 of plate 318. The right-hand support for shaft 344 is similar to the left-hand support except that allowance has been made for lateral movement of the roller due to heat expansion. The bearing 348 is supported by the gib 350 in slot 352 of the plate 320. However, there is no inner annular lip on the gib used on the right-hand support and the retaining cap 360 is secured to the gib by screws 362 but does not extend over any portion of the bearing 348 and thus does not restrict movement of the bearing 348 in a lateral direction. The cap 360 does extend outward over the plate 320 to provide a sliding surface which also retains the gib 350 in the plate 320.

The gibs 350 are movable in a vertical direction in slot 352 to bring the pressure roller 72 into and out of contact with the pressure roller 70 so that when the fuser is not in operation the pressure between the two rollers may be relieved and the surface of the rollers will not be permanently deformed. The actuating mechanism to move the pressure roller into and out of contact with the heated roller is described below.

Also journaled in the side plates 318 and 320 is a clutch and cam shaft 364. Mounted on the shaft 364 is an electric clutch 366 and a cam 368. The left-hand portion of the shaft 364 is secured to one clutch plate of the clutch 366 and is journaled in plate 318 by bearing 370. The bearing 370 is retained in the plate 318 by bearing retaining cap 372 and an inner retaining ring 374 fastened together by screws 376. The right-hand portion of shaft 364 is secured to the other clutch plate of clutch 366 and is journaled in bearing 378 in side plate 320. A gear 380 is secured to the end of shaft 364 by set screw 382 and meshes with gear 384 on the output shaft 386 of a speed reducer 388. The speed reducer 388 is secured to the plate 318 and has as its input shaft the output of motor MOT-1. The motor MOT-1 drives one end of shaft 364 through the speed reducer 388, gears 384 and 380, up to the clutch 366. Actuation of clutch 366 drives the cam end of shaft 364 and produces movement of cam 368.

As seen in FIGS. 7 and 9, a cam follower 390, formed as an integral part of yoke 392, rides on cam 368 and produces movement of yoke 392 upon rotation of the cam. The yoke 392 extends downward and is pivoted to the plates 318 and 320 by pin 394 so that upon movement of cam 368 the yoke revolves about the pins 394. A toe 396 is formed on each end of the yoke 392 and is fastened to the bottom of gibs 350 by pins 398 so that, as the yoke 392 is pivoted about the pin 394, the gib 350 is moved upward or downward with the movement of toe 396. Thus, the pressure roller 72 may be moved into and out of contact with the heated roller 70.

When the cam 368 has revolved approximately a quarter turn, it is at the position of maximum movement for yoke 392 and the yoke contacts can limit switch LS–1, which cuts off the power to motor MOT–1. The motor MOT–1 has a braking action built therein to immediately stop movement of cam 368. The movement of yoke 392 to move the pressure roller 72 into contact with roller 70 is against the action of a pair of compression springs 402, one of which is shown in FIGS. 7 and 9. The spring 402 is mounted on an internal guide 404 secured to the yoke 392 beneath the pin 394. The spring 402 acts against a shoulder portion of the guide 404 and against a bracket 406 secured to base frame 408. The action of spring 402 forces the yoke 392 about pin 394 against cam 368 in such a direction as to tend to separate rollers 72 and 70. When the power to motor MOT–1 is cut off, the power is maintained on clutch 366 so that the force of spring 402 does not force the yoke 392 against the cam 368 so that the cam would rotate. The friction of the clutch 366 in the gears 380 and 384 prevents rotation of the cam 368. The motor MOT–1 has a built in brake which is actuated when the power is cut off to immediately stop the motor. When the power is cut off, the clutch 366 and the clutch plates disengage, a small torsion spring 410 rotates cam 368 back to the position of minimum travel of yoke 392, and yoke 392 is pivoted about pin 394 by the force of compression springs 402 so that pressure roller 72 is withdrawn from contact with the heated roller 70.

The movement of the pressure roller 82 of the web cleaner 76 is coordinated with the movement of the pressure roller 72 of the heat fuser. The actuation of the cleaning roller 82 is also controlled by movement of yoke 392 under the influence of cam 368 so that the pressure roller is only in contact with the xerographic drum during the times that the pressure roller 72 of the fuser is in contact with the heated roller 70. As previously pointed out, the cleaning roller 82 is supported by a pair of yokes 214 and 216 pivotally mounted about torque tube 218. Yoke 216 has a slide bar 412 pivotally connected thereto by pivot pin 414. The slide bar 412 has a slot 416 sized to permit movement of the slide bar about a bolt 418. The bolt 418 passes through the slot 416 and is mounted in a dog 420 on the yoke 392. At the opposite end of the web cleaning yoke 216 is mounted compression spring 236. As previously described, the compresison spring 236 causes the yoke 216 to be pivoted about the torque tube 218 so that the cleaning roller 82 is forced into contact with the xerographic drum 18. When the main yoke 392 is forced by springs 402 back to the low point of cam 368, separating the rollers 70 and 72, the web cleaning yoke 216 is drawn about torque tube 218 against the action of spring 236 by means of the bolt 418 in the dog 420 pulling against the slide bar 412 pivoting the yoke about the torque tube. In the opposite direction, when the main yoke 392 is moved forward, the bolt 418 tends to move along the slot 416 permitting the compression spring 236 to pivot the yoke 216 about the torque tube.

*Drive system*

Figure 6:
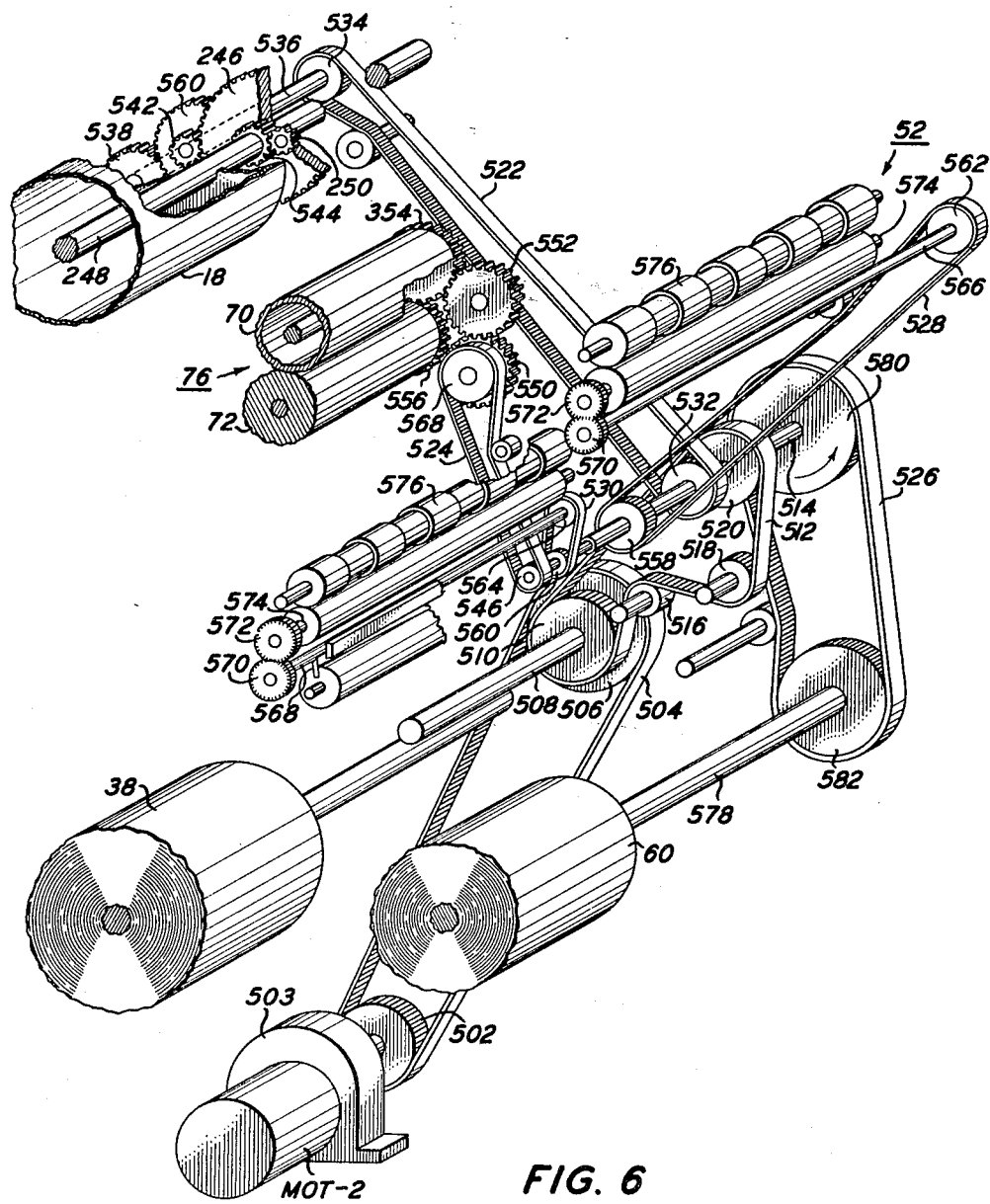
FIG. 6 is a left-hand perspective view of the drive system of the apparatus along with the shafts and rolls being driven with parts and sections and removed from the rest of the apparatus.

The drive system for the entire apparatus is located on the right-hand side of the machine and is seen in FIGS. 3 and 6. Main drive motor MOT–2 is mounted at the bottom of the machine and drives a pulley 502 through gear box 503. Power is transmitted from the motor MOT–2 and the pulley 502 to an idler shaft 508 by means of belt 504 and pulley 506. The power is further transmitted to the main idler shaft 514 at reduced speed by means of pulley 510 and belt 512. The belt 512 passes around a pair of idler pulleys 516 and 518 and pulley 520 on shaft 514.

All the portions of the machine which are driven from the main drive motor are driven off the main idler shaft 514. As shown in FIG. 6, the xerographic drum 18 is driven from belt 522; the fuser, which also serves as the driving force for paper web 36, is driven from belt 524; the web take-up roll 60 is driven from belt 526; the pinch rollers 52 driving the web intermediate the fuser and the web take-up roll are driven by belt 528; and the pinch rolls located at the paper cutter 62 are driven by belt 530.

The xerographic drum drive belt 522 is driven by pulley 532 and drives pulley 534 mounted on shaft 536. Also mounted on shaft 536 is gear 538 which drives a gear train consisting of gear 540, spur gear 542, and the gear 246 mounted on the xerographic drum shaft 248. Thus, when the main drive motor MOT–2 is started, power is transmitted directly to the xerographic drum through the belts 504, 522, and the gear train just described. Also mounted on the shaft 248 is a spur gear 544 which drives gear 250 in the gear train of the web cleaner, as described above. Therefore, it can be seen that simultaneously with the movement of the xerographic drum, movement of the web cleaner is effected. For simplicity purposes, the gear train for the web cleaner has not been shown in FIG. 6 but is shown in detail in FIG. 7. The belt 524 driving the fuser 76 is driven by pulley 546 and drives pulley 548. Both the heated roll 70 and the pressure roll 72 of the fuser are driven through a gear train consisting of a gear 550 mounted on the same shaft as the pulley 548, an idler gear 552 which meshes with the gear 550 and with a gear 554 mounted on the heater roll shaft. The gear 554 also meshes with and drives gear 556 mounted on the pressure roll shaft.

The two pairs of pinch rolls for driving the paper web are both driven in the same manner; that is, belts 528 and 530 are driven by pulleys 558 and 560, respectively, and drive pulleys 562 and 564 on shafts 566 and 568, respectively. The shafts 566 and 568 each have a gear 570 at the opposite end of the shaft which meshes with and drives a gear 572 on the shafts 574. The shafts 574 are the drive shafts for the pinch rollers and have a covering of rubber which is in contact with the idler roll 576, also covered with rubber.

Finally, the paper web take-up roll 60 mounted on shaft 578 is driven by belt 526 from pulley 580 on shaft 514 to pulley 582 on shaft 578. The pulleys and gears are properly sized so that the web 36 is driven at constant speed through the fuser 70 and through either pair of pinch rolls onto take-up roll 60. Likewise, the peripheral speed of drum 18 is the same as the peripheral speed of the fuser 76 so that when the web 36 is electrostatically tacked to the xerographic drum surface by transfer corotron 68, the surface of the drum is traveling at the same speed as the surface of the web and there is no relative motion between the two surfaces.

*Paper cutter*

Figure 12:
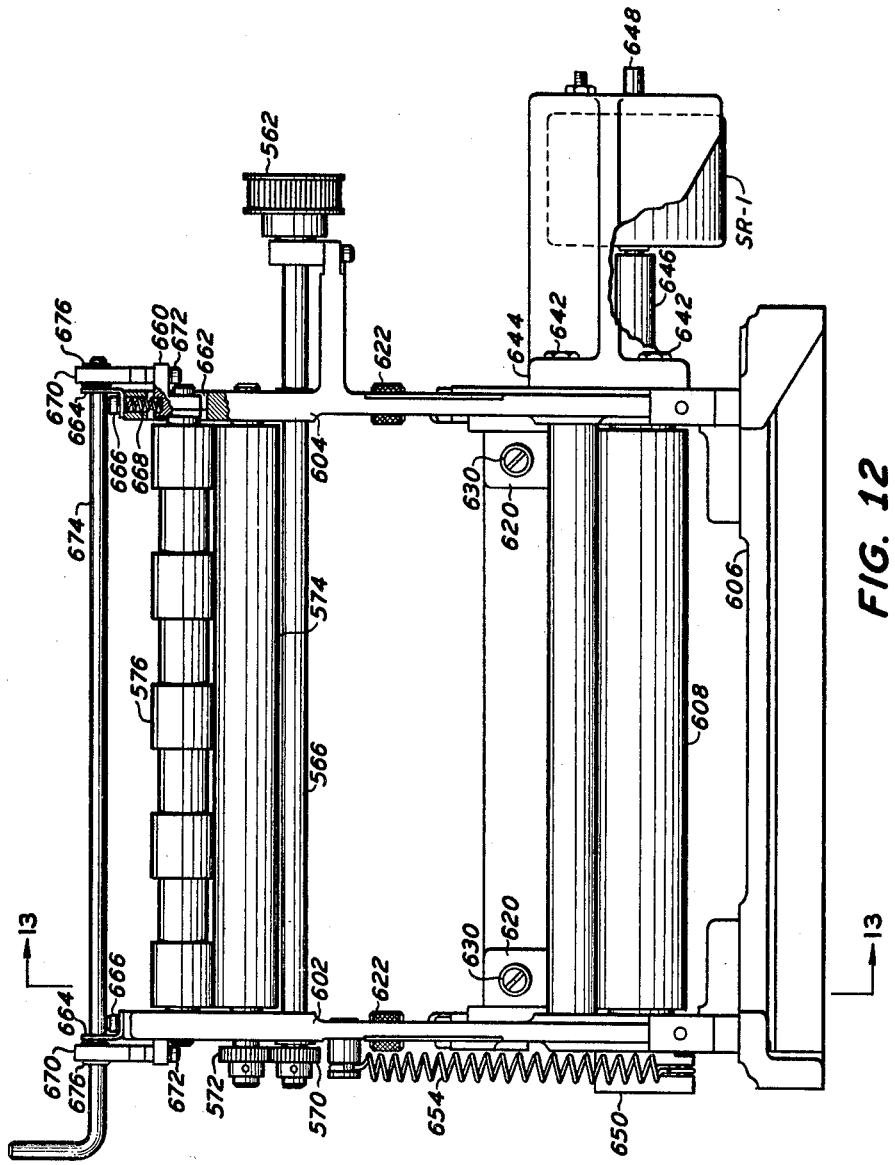
FIG. 12 is a front sectional view of the paper cutter apparatus taken along lines 12—12 of FIG. 4.
Figure 13:
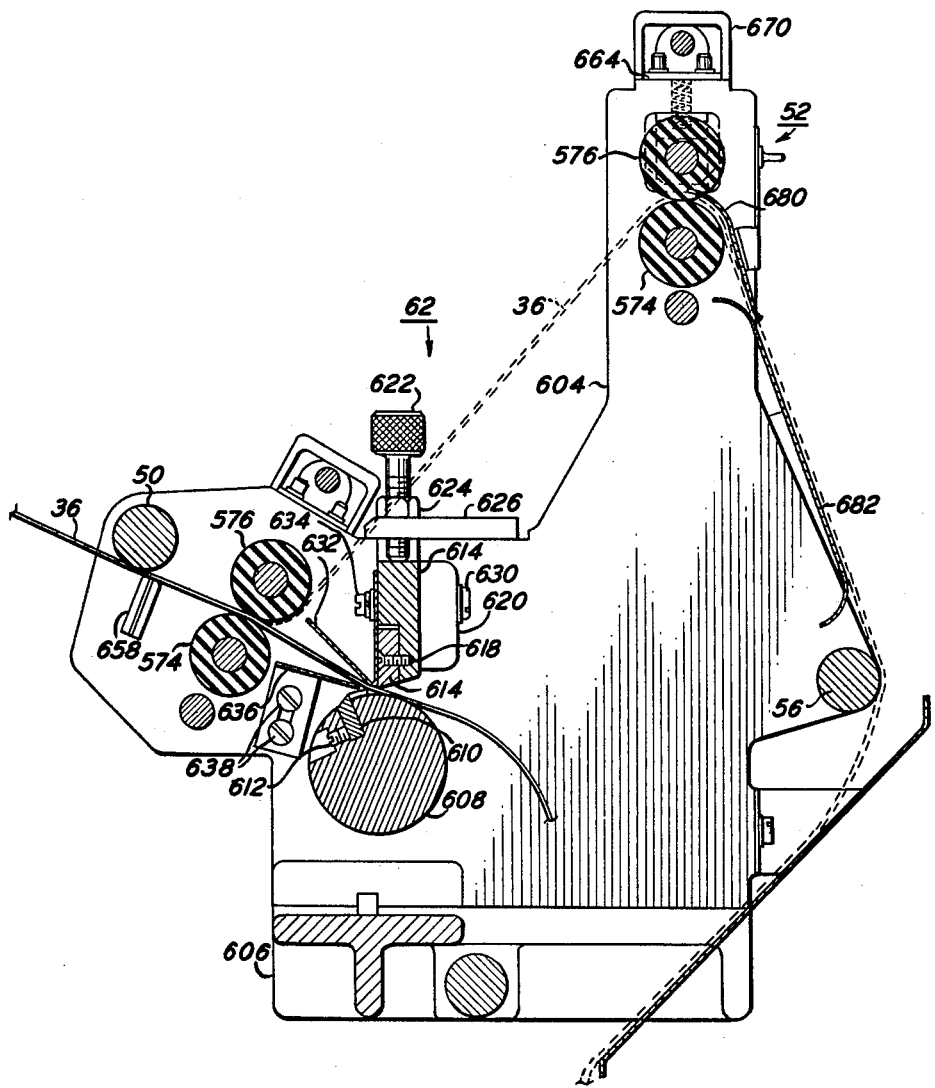
FIG. 13 is a left-hand section view of the paper cutter apparatus taken along lines 13—13 of FIG. 12.
Figure 14:
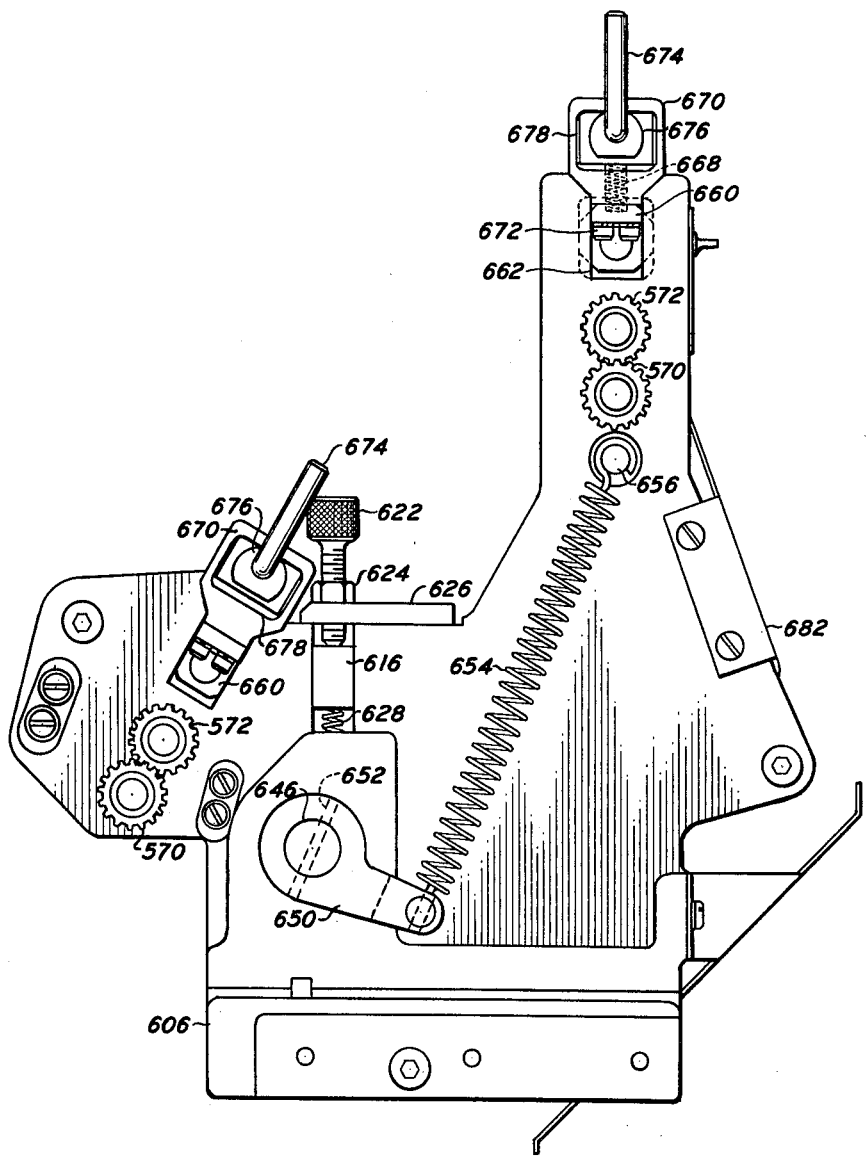
FIG. 14 is a left-hand view of the paper cutter apparatus shown in FIG. 12.

Referring now to FIGS. 12 through 14, there is shown paper cutter 62. The cutter is supported in two side plates 602 and 604 mounted on a cross-member 606. A cutter roll 608 extends between the two side plates 602 and 604 and is journaled therein. The cutter roll extends across the width of the paper web 36 and has, mounted in a groove therein, a rotary cutter blade 610 held in place by means of set screws 612.

Immediately above the cutter roll 608 is a stationary cutter blade 614 mounted in an adjustable mounting block 616 by means of a series of screws 618. The adjustable support block 616 is supported on springs 628 in slots in the side plates 602 and 604. The movable block 616 rests on the springs 628 and is adjusted by downward pressure of an adjusting screw 622 located on each side of the cutter. The adjusting screw 622 cooperates with nut 624 secured to member 626. The opposing action of the adjusting screws 622 and the springs 628 permits positioning and adjusting of the cutting edge of the stationary blades 614. After the blade has been adjusted, it may be locked into position by screws 630 in blocks 620. The blade 614 is adjusted to cooperate with the rotating blade 610 so that, as the cutter roll 608 is rotated, a shearing action will occur between the two blades to cut the web passing therebetween.

As the paper web 36 leaves the web supply roll 38, a graphite marker 39 of the type sold by Eastman Kodak Company of Rochester, New York, as Kodak Print Marker Model No. 5, places a graphite mark on the back of the web in response to a signal indicating the leading or trailing edge of a document being transmitted. As the web approaches the cutter 62, it passes under roller 50 and between a pair of drive rollers 574 and 576. A web guide 632 is mounted above the web on the movable blocks 616 by means of screws 634 and deflects the web downward between the cutter roll 608 and the stationary blade 614. Beneath the web there is also a guide 636 secured to the side plates by means of screws 638 to also guide the web between the cutter roll 608 and the stationary blade 614.

Mounted on the right-hand side of the cutter, as seen in FIG. 14, and secured to side plates 604, by means of bolts 642, is a bracket 644 supporting a rotary solenoid SR-1. The solenoid SR-1 is positioned so that the armature 648 is coupled with the shaft 646 of the cutter roller 608 so that the cutter roller is rotated in response to actuation of the solenoid SR-1. At the opposite end of the cutter roll 608 on the outside of side plate 602 there is a return lever 650 pinned to the shaft 646 by pin 652. A tension spring 654 extends between the lever 650 and a stationary pin 656 mounted in the side plate 602. When the solenoid SR-1 is actuated, it rotates the cutter roll 608 through an arc of approximately 25° so that the rotary cutter blade 610 passes in cutting relationship to the stationary cutting blade 614. At the completion of the rotational movement of the cutter roller 608 and upon deactivation of the solenoid SR-1, the spring 654 acting upon lever 650 returns the cutter roll 608 to its original non-cutting position, as shown in FIG. 12.

As the web 36 approaches the cutting station, it passes under roller 50 and, at the same time, passes over a mark sensing device 658. The mark sensing device is positioned in the path of movement of the web so that the graphite mark placed on the back of the web by the marker 39 passes over the mark sensing device. The mark sensing device consists of two electrical conductors separated by an insulating gap and connected to a suitable source of electric power. When unmarked paper passes over the mark sensing device, it is in contact with both of the electrical conductors, but, since the paper is not itself an electrical conductor, the circuit from the source of electrical power through the mark senser to the solenoid SR-1 is an open circuit. When a graphite mark comes in contact with the two electrical conductors in the mark sensing device, a circuit is actuated and electrical power is supplied to the solenoid, thus actuating the cutter 62.

The pinch rollers 574 and 576 drive the web forward through the paper cutter. The rollers are covered with rubber or resilient material and are driven by pulley 564, shaft 568, and gears 570 and 572. The rollers 570 and 572 are journaled in the plates 602 and 604. The alternate drive rollers 574 and 576, which drive the web when it is not intended to pass through the paper cutter, are also journaled in the side plates 602 and 604. Roller 574 is driven from pulley 562 through shaft 566 to gears 570 and 572. Both pairs of rollers 574, 576, are mounted in the frames 602 and 604 in a similar manner so that they may be separated or forced into contact one with the other. The bottom rolls 574 are mounted in the side frames so that they are held stationary, while the upper rollers 576 are journaled in a sliding L-shaped member 660. The L-shaped member 660 can raise the shaft 675 and is movable in slot 662 cut in the side plates. Over the slot 662 is mounted a bracket 664 by screws 666. A compression spring 668 bears against the bracket 664 covering the slot 662 at one end and against the L-shaped member 660 at the other end forcing the L-shaped member towards the bottom of the slot, thus pressing the rolls 576 against rolls 574.

The portion of the L-shaped member 660 which extends outward from the side plates 602 and 604, is connected to a cam follower 670 by screws 672. A rod 674 extends between the two brackets 664 and has a handle at one end at right angles to the center of the rod so that the rod may be rotated in the brackets 664. Located on the rod 674 immediately adjacent to the brackets 664 are a pair of cams 676. The cams 676 are positioned so that they extend into an opening 678 in the cam follower 670. The rotational movement of the rod 674 will produce movement of the cams 676 and thus the follower 670 lifting the L-shaped member 660 containing the shaft for roller 576. Thus, the roller 576 is moved away from the roller 574 against the action of compression spring 668 and paper may be inserted between the two rolls. Again rotating the rod 674 to its original position drops the cam follower 670 and permits the compression spring 668 to force the L-shaped member 660 downward so that the roll 576 presses against the drive roll 574.

As the web 36 is passed between the pinch rollers 52 so that it does not pass through the paper cutter 62, the web is guided downward by a guide 680 and over a plate or guide 682, at which point, the web may be passed around roller 56 to the take-up roll 60, or it may be passed out of the machine at feed-out station 64. A glass platen 683 is positioned immediately in front of the plate or guide 682 so that as copy passes over the plate 682 it may be seen through the glass platen. The tear bar 54 is located immediately at the bottom of the glass platen.

*Operation*

The following description of the operation of the recorder apparatus will include a description of the electrical circuitry that is utilized in the present invention for conditioning and controlling the operation of the apparatus throughout an entire cycle of producing a xerographic copy of the document.

In the description to follow, it is assumed that the recorder apparatus is completely shut down, that is, all power circuits to the electrical system are open. For a clearer understanding of the operation of the apparatus, reference is made to the schematic wiring diagram of FIG. 15 and to the operating characteristic of the machine elements, as previously described. Before the xerographic recorder apparatus may be actuated, the cover panel for the cabinet enclosing the apparatus must be placed in closed position to actuate an interlock switch 700 mounted on the cabinet frame, not shown. Additional interlock switches 702 for the power supplies are connected in series with the interlock switch 700. These interlock switches are used so that the apparatus may be operated only when the panel for the cabinet is in closed condition, and the power supplies are operating within a specified temperature range. It will be apparent that any other protective interlock switches may be added in order to insure proper positioning of subassemblies before the apparatus can be operated.

The entire assembly of the apparatus is supplied with electrical power by the closure of the main power switch 706 which connects the apparatus through a circuit breaker CB-1 to a suitable source of power, such as a commercial 120 volt, 60-cycle alternating current outlet, indicated at 708. Preferably, the outlet 708 has three terminals: one connected to a power conductor 710, another to a neutral conductor 712, and the third to a ground conductor 714. In effect, the neutral conductor serves as a return line for an A.C. circuit, while the ground conductor 714 serves as ground for a D.C. circuit that is incorporated in the A.C. circuit.

With the closure of the main power switch 706, the apparatus is placed in an "OFF" condition, as indicated by lamp LMP–1, through a circuit traced as follows: conductor 710, primary 716 of a step-down transformer TR–1, secondary conductor 718, lamp LMP–1, conductor 720, normally closed relay switch 1CR–2B, and secondary conductor 722.

The transformer TR–1 steps down its primary voltage to 12.6 volts, which is developed across the end terminals of the secondary for the conductors 718, 722. Center tapping the secondary results in providing a source of 6.3 volts for the filament in the C.R.T.

In order to place the apparatus in its "ON" condition, the normally open, manually actuated "ON" switch SW–1 is closed by an operator. Closing of the switch SW–1 will provide electrical power to a D.C. power supply PS–1. Provisions for the D.C. power supply may be traced as follows: conductor 710, closed switch SW–1, normally closed "OFF" switch SW–2, conductor 724, power supply PS–1, conductor 726, and neutral conductor 712. Energization of the power supply PS–1 produces a D.C. voltage at the point 728, and this voltage is impressed upon a conductor 730, which has in series therewith the interlock switches 700 and 702 connected through a relay coil 1CR to the ground conductor 714. With the relay coil 1CR thus energized, one of its normally open relay contact switches 1CR–1 will be closed in order to bypass the switch SW–1, thereby permitting the operator to release the switch and still maintain energization of the circuits so far described.

Energization of the relay coil 1CR will also actuate its normally open contact switch 1CR–2A to a closed position and actuate its normally closed contact switch 1CR–2B to an open position. By energizing contact switches 1CR–2A and 1CR–3A, electrical power is established in the filament circuit for the C.R.T. by way of the secondary conductor 722, 1CR–2A, a conductor 734, and a center-tap conductor 736, and 1CR–3A. This action will also energize the relay coil 2CR, open the circuit to the "OFF" lamp LMP–1, and close the circuit to the "ON" lamp LMP–2 through a circuit as follows: secondary conductor 718, lamp LMP–2, conductor 738, switch 1CR–2A, and secondary conductor 722. Since the contact switch 1CR–2B has been actuated to an open position when the relay coil 1CR was energized, the circuit to the lamp LMP–1 is opened.

Energization of the relay coil 2CR closes the normally open relay switch 2CR–1 connected in series in the power conductor 710 and the normally open contact relay switch 2CR–2 connected in series in the neutral conductor 712. As shown in FIG. 15, closing of the relay switches 2CR–1 and 2CR–2 will provide electrical power to the various electrical devices in the xerographic reproducing apparatus after certain other controls have been activated. As shown in FIG. 15, however, there are some devices which are immediately energized upon closing of these relay switches. Among these devices is a running time meter 740, which serves to record the "ON" time for the apparatus, a fan motor MOT–5, which is utilized to cool the upper compartment of the apparatus, and a second fan motor MOT–6 for cooling the lower part of the compartment of the apparatus, as shown in FIG. 3.

Closing of the relay switches 2CR–1 and 2CR–2 also energizes a relay coil 742 which closes a contact switch 744 to connect the fuser heater element R–1 to the A.C. power supply. A normally closed thermostatic switch TS–1 in the circuit to the coil 742 serves to protect the apparatus in the event that the fuser becomes overheated.

In addition to these devices that are energized upon closing of the relay switches 2CR–1 and 2CR–2, some of the C.R.T. electrical requirements, illustrated in the drawing by the block 746, are connected to the A.C. electrical source by means of a conductor 748 connected to the power conductor 710.

As previously stated, the filament circuit for the C.R.T. was energized when the relay coil 1CR became energized to close its contact switches 1CR–2A and 1CR–3A. Since it normally takes 20 seconds for a C.R.T. filament to become sufficiently heated for efficient operation of the C.R.T., a timing circuit is provided for insuring that 20 seconds has elapsed after the C.R.T. filament has been energized and before xerographic processing and scanning by the C.R.T. can commence. This timing device is in the form of a thermal timing device having thermally actuable element 1TR for actuating a normally open switch 1TR–1 and a normally closed switch 1TR–2. In cooperation with this timing device is a relay coil 7CR having a normally closed relay switch 7CR–1B, normally open switch 7CR–1A and normally open relay switch 7CR–2. The thermal timing device may be of the standard commercial type which is set to complete its full operation 20 seconds after initial energization thereof. This timing cycle may consist of a heating period and a cooling period, the total of which runs for approximately 20 seconds. Operation of the thermal timing device will be described as follows. Upon closing of the relay switches 2CR–1 and 2CR–2, the heating element of the timing device will become energized through a circuit which includes a conductor 750, the normally closed switch 7CR–1B, and the heater element of the timing device 1TR. When the heating cycle has terminated, the switch 1TR–1 is closed and the switch 1TR–2 opened. Closing of the switch 1TR–1 energizes the relay coil 7CR which closes its relay switch 7CR–1A to maintain energization of the relay coil and opens the relay switch 7CR–1B in order to open the circuit to the timing device 1TR and permit cooling thereof. Energization of the relay coil 7CR also closes its contact switch 7CR–2. When the heating device 1TR has cooled sufficiently at the end of 20 seconds from the time of energization thereof, its switch 1TR–2 is closed. In this position of the parts, both switches 1TR–2 and 7CR–2 are closed to complete a circuit to a control circuit for a purpose to be described hereinafter.

The xerographic recorder apparatus is now in "stand-by" condition. In this condition, the electrical power to the apparatus is complete, various interlock switches are closed, the C.R.T. filament is fully energized, the fuser heater element R–1 is heating up, the running time meter 740 is in operation, and certain electrical requirements for the C.R.T. are connected to the source of electrical supply. Before describing the operation and electrical connections to the xerographic processing devices, the functioning of the control circuit for the apparatus will now be described.

The function of the control circuit is to receive various electrical and electronic inputs and to produce signals for controlling devices in the apparatus. It also has the function of receiving signals from the transmitter for producing other control signals for the xerographic processing devices.

Since the transmitter and the xerographic processing mechanism are located at remote stations, it is desirable that an operator at the transmitter station be apprised of the condition of the processing mechanism which is not under his immediate supervision. The equipment includes means which will indicate to the operator that the recorder apparatus is in a condition which will permit transmission of the information on the document. This means is in the form of a communication arrangement which results in communication between the transmitter and apparatus and takes the immediate form of signals, called tones, that are transmitted to the transmitter and apparatus in a certain specific sequence.

As shown in FIG. 15, there are provided four switches 756, 757, 758, 759, preferably connected electrically in series, which serve as interlock switches for the various xerographic processing devices. Specifically, the switch 756 is structurally connected to the drum 18 and is actuated to a closed condition when the drum is in position. The switch 757 is arranged adjacent the paper web 36 and will be normally closed as long as there is tension in the web, thus indicating that there is no break in the web. The switch 758 is arranged structurally adjacent the paper supply roll 38 and is normally closed when there is paper present on the roll. The switch 759 is arranged relative to the web cleaner material 78 and will remain closed as long as the material is of sufficient length to serve its function. When all four switches are closed, that is, these conditions exist: the drum is in its proper operating position, the paper is not broken, the paper supply is ample, and the web cleaner is of sufficient length, a circuit is closed to a suitable device 760, such as a Schmitt trigger which will convert the closing of all the switches to a signal. This signal is conveyed by conductor 762 as an input to a logical AND gate G–1.

Another input signal for the gate G–1 in the control circuit is produced by the closed condition of the circuit that includes switches 1TR–2 and 7CR–2, which is indicative that the filament warm-up timer has been timed out. Closing of these switches closes a circuit to a device 764, which may be similar to the device 760, for producing a signal indicative of the switch closures, and this signal is conveyed by conductor 766 as a second input to the gate G–1. A third input to the gate G–1 from the electrical circuit is derived from a thermoswitch SW–3 which is actuated to a closed position when the fuser heater R–1 has reached a temperature suitable for xerographic fusion. When the switch SW–3 is closed, a circuit to a device 768, that is similar to device 760, is completed for producing a signal in conductor 770 to be conveyed as an input to the gate G–1. When these three inputs are received by the gate G–1, as indicative of (1) the operative condition of the four process interlocks, (2) the heating of the C.R.T. filament, and (3) that the fuser is at its operating temperature, the xerographic recorder apparatus is in "ready" condition.

Further control of the xerographic reproduction mechanism from this point on is, in effect, under the control of the transmitter. The transmitter transmits a signal, hereafter referred to as tone 1, in order to check the condition of the recorder apparatus for producing a xerographic copy thereof. Tone 1 may be transmitted from the transmitter by a suitable line T–1 to the control circuit of the recorder apparatus to serve as the fourth input to the gate G–1. With the presence of the four inputs, above described, the AND gate G–1 produces a signal and transmits the signal back along the same cable to the transmitter. This signal, hereafter referred to as tone A and indicated in FIG. 15 by T–A, in effect indicates to the transmitter that it is in "ready" condition. Since all four inputs are required to produce this tone A, it will be apparent that if any of the inputs or if any of the other conditions which go to make up on input is not in operative condition, the control circuit will be unable to generate tone A. In order to further condition the xerographic recorder apparatus for producing a xerographic copy of the document, tone A must have been generated by the control circuit.

Assuming that all of the previously described circuits and elements are in operative condition, the generation of the tone A signal by the control circuit for transmission to the transmitter will also result in the actuation of other devices in the apparatus. The signal from the gate G–1 is conveyed by a conductor 772 to drive a relay coil 3CR for closing a switch 3CR–1 which connects the C.R.T. supply 774 to the electrical power supply by way of conductor 776.

With the reception of tone A at the transmitter, the operator may insert the document into the transmitter for scanning thereof by the scanning device utilized therein. Since a C.R.T. is employed in the xerographic recorder apparatus, it is preferable that the sweep thereof be synchronized with the scanning device in the transmitter. Since devices to accomplish this are quite common, description of a device to insure an "in sync" condition will not be presented here. When a recorder "in sync" condition does exist a signal is generated in a circuit indicated by the reference number 780. This "in sync" signal is conveyed as an input to a logical AND gate G–2 as is the output signal of the gate G–1. The resulting signal from the gate G–2 is conducted to the electrical circuit along a conductor 782 to drive a relay device 5CR which, in turn, closes its contact switch 5CR–1.

As shown in FIG. 15, closing of the relay switch 5CR–1 simultaneously closes (1) the circuit for the fuser positioning motor MOT–1 through a normally closed switch SW–4, (2) the circuit for the fuser electric clutch 366, and (3) the circuit to the discharge lamp 86. Energization of the clutch 366 connects the fuser positioning motor to the actuating cam 368 for fuser 48 and web cleaner 76, thereby bringing the two fuser rollers in contact with the web while at the same time moving the web cleaner in contact with the drum surface. When the fuser rollers are in contact with the web and the web cleaner is in its proper operative condition, the switch SW–4 will be actuated to an open condition for terminating operation of the fuser positioning motor MOT–1 and a switch SW–5 will be closed. As previously stated, after the fuser positioning motor has been de-energized, the fuser rollers will still remain in contact.

Actuation of the switch SW–5 to closed condition will connect (1) the main drive motor MOT–2, (2) the developer drive motor MOT–4, and (3) the corotron supply PS–2 to the power conductor 710 for energizing these devices. Energization of the corotron supply will generate current for the three corotrons 20, 68 and 74. From the foregoing, it will be noted that closure of the relay switch 5CR–1 caused immediate actuation of the fuser rollers into contact and movement of the web cleaner into contact with the drum 18, and that actuation of the main drive, the developer drive, and energization of the corotron supply were suspended momentarily until the fuser rollers and the web cleaner were in their proper operating positions.

Movement of the fuser rollers into contact closes another switch SW–6 that may be positioned structurally adjacent one of the rollers. This switch performs an interlocking action and the closing thereof closes a circuit to a device 784, similar to the device 760, for generating a signal that is indicative of the closed condition of the switch. This signal is conveyed by a conductor 786 as an input to a logical AND gate G–3. The gate G–3 is adapted to receive three inputs, which, when received, produce an output, here designated as tone B and illustrated by T–B, which is transmitted to the transmitter. The two other inputs to the gate G–3 are the "in sync" signal from the generator 780 and the "ready" signal from the gate G–1. Tone B, then, is generated when all of the xerographic processing devices are operating for producing a xerographic copy of the document and this condition of the apparatus is exhibited as tone B.

Upon reception of tone B from the xerographic recorder apparatus as an indication that the apparatus has commenced xerographic processing, the operator may immediately transmit a signal of very short duration back to the recorder apparatus in the form of tone 3 illustrated by T–3, which is adapted to be combined in a logical AND gate G–4 with the "ready" signal from gate G–1 to produce a control signal for actuating the paper marking device 39. This control signal is conveyed by conductor 790 to drive a relay coil 6CR which, in turn, closes its relay switch 6CR-1 for actuating the paper marking device 39. Preferably, the marking device will mark the web at a point which corresponds to the leading edge of the document being transmitted in facsimile.

Another signal, in the form of tone 2 illustrated by T-2, may also be initiated by the operator immediately after his sending of tone 3. Tone 2 may be combined as an input to a logical AND gate G-5 with the "ready" signal from gate G-1 to produce a signal for operating a footage meter. This signal, conveyed by a conductor 794, is utilized to drive a relay coil 4CR for closing a relay switch 4CR-1 for energizing a footage meter 795 for metering the amount of copy being reproduced at the recorder apparatus.

Similarly, when tone 2 has ceased being sent, and has effectively measured the copy length, tone 3 is again sent to mark the trailing edge of the document.

While the document is being scanned at the remote transmitter, the C.R.T. continues exposing the drum during rotation thereof in order to record the information on the document. Subsequent reproduction of a xerographic facsimile of the document upon the web results as the xerographic processing devices operate. Termination of operation of the xerographic recorder apparatus is preferably brought about by utilizing the termination of the generation of the "in sync" signal by the generator 780. This may be conveniently accomplished when the transmitter scanning device has finished scanning the document and no longer is capable of producing a composite video signal of the document. However, since the xerographic processing devices must continue their respective operations after the drum has been exposed, a suitable timing device should be utilized for continuing the generation of the 'in sync" signal until after all xerographic processing of a document has been accomplished. Immediately after xerographic processing has been accomplished, the paper marks, which were previously placed upon the web as indications of the starting and ending points on the web corresponding with the leading and trailing edges of the document being transmitted in facsimile, may be utilized to initiate the actuation of the paper cutter 62. This may be accomplished with the use of a suitable sensing device 796 and circuit 798 therefor with the sensing device being spaced adjacent the cutter so as to be operative at points on the web corresponding to the two marks of the document. When the paper mark on the web is sensed by the sensing device 796, the circuit 798 is adapted to produce a current to energize a relay coil 8CR for closing a switch 8CR-1 which action energizes a solenoid 800 for actuating the cutter 62. The sensing device may be of the type which optically or electrically picks up the mark on the web and produces or causes the generation of a signal which the circuit 798 will convert to a sufficient level for energizing the relay coil 8CR. Such an arrangement suitable for the xerographic recorder apparatus is illustrated and disclosed in Patent No. 3,075,493 to Cerasani et al.

When the "in sync" signal is terminated, the gate G-2 can no longer generate the signal which will maintain the relay switch 5CR-1 closed. This switch will open, thus deactivating the main drive motor MOT-2 and the developer motor MOT-4, de-energize the corotron supply PS-2, and the fuser clutch 366. This latter action will permit the springs 402 to move the fuser roller out of contact with the roller and also to disengage the web cleaner from the drum.

The recorder apparatus, however, remains in condition for producing a xerographic facsimile of a second document. If a document is again scanned by the transmitter, which results in the production of an "in sync" signal, the above-described operation will commence.

Complete shut down of the recorder apparatus is accomplished by manually actuating the normally closed switch SW-2, which action will open the circuit to the relay coil 1CR and consequent opening of the relay switches 2CR-1 and 2CR-2. Opening of the latter switches will terminate energization of the fuser element R-1, the fan motors MOT-5, MOT-6, and prevent energization of the xerographic processing devices.

What is claimed is:

1. In a xerographic reproducing apparatus having a rotatable xerographic drum on which xerographic powder images may be formed,
   means for transferring xerographic powder images from the drum surface to a support surface,
   drum cleaning apparatus for applying cleaning material to the drum surface for removing residual powder images from the drum surface after transfer,
   means for fusing transferred xerographic powder images to the support surface,
   the combination of a movable member in the cleaning apparatus movable to an operative position in which it presses a cleaning material into surface contact with the xerographic drum and to an inoperative position in which the cleaning material is removed from the drum surface,
   a movable member in the fusing apparatus movable to an operative position in which it is effective to press the support surface with powder image thereon into surface contact with a fusing roll and to an inoperative position in which the support surface is removed from contact with the fusing roll, and
   actuating means operatively connected to both said movable members, said actuating means being movable to a first position in which it is effective to move both said movable members to their respective operative positions and to a second position in which it is effective to move both said movable members to their respective inoperative positions.

2. In a xerographic reproducing apparatus having a rotatable xerographic drum on which xerographic powder images may be formed,
   means for transferring xerographic powder images from the drum surface to a support surface,
   drum cleaning apparatus for applying cleaning material to the drum surface for removing residual powder images from the drum surfaces after transfer,
   means for fusing transferred xerographic powder images to the support surface,
   the combination of a movable member in the cleaning apparatus movable in an operative position in which it presses a cleaning material into surface contact with the xerographic drum and to an inoperative position in which the cleaning material is removed from the drum surface,
   a movable member in the fusing apparatus movable to an operative position in which it is effective to press the support surface with powder image thereon into surface contact with a fusing roll and to an inoperative position in which the support surface is removed from contact with the fusing roll,
   actuating means operatively connected to both said movable members, said actuating means being movable to a first position in which it is effective to move both said movable members to their respective operative positions and to a second position and in which it is effective to move both said movable members to their respective inoperative positions,
   said actuating means including biasing means to urge the movable members to their inoperative positions, and
   motive means to urge the movable members to their operative positions.

3. In a xerographic reproducing apparatus having a rotatable xerographic drum on which xerographic powder images may be formed,
   means for transferring xerographic powder images from the drum surface to a support surface, drum cleaning apparatus for applying cleaning material to the drum surface for removing residual powder images from the drum surface after transfer, means for fusing transferred xerographic powder images to the support surface, the combination of a movable member in the cleaning apparatus movable to an operative position in which it presses a cleaning material into surface contact with the xerographic drum and to an inoperative position in which the cleaning material is removed from the drum surface, a movable member in the fusing apparatus movable to an operative position in which it is effective to press the support surface with powder image thereon into surface contact with a fusing roll and to an inoperative position in which the support surface is removed from contact with the fusing roll, a yoke member coupled to both the movable members and pivotally supported to be movable between a first position wherein both said movable members are in their respective operative positions and a second position wherein both said movable members are in their respective inoperative positions, a first biasing means effective to urge the yoke member to its second position whereby both movable members are urged to their respective inoperative positions, drive means to move the yoke member to its first position whereby the movable member of the fusing apparatus is moved to its operative position, and a second biasing means to urge the movable member of the cleaning apparatus to its operative position when the yoke member is moved to its first position.

4. The apparatus of claim 3 wherein said drive means includes a cam effective to move the yoke member from its second position to its first position, a motor operatively connected to rotate the cam, and a clutch interposed in the connection between the motor and the cam, whereby actuation of the motor rotates the cam to move the yoke from the second position to the first position and upon stopping of the motor the yoke is retained in the first position by the cam and the friction in the connection between the cam and motor until the clutch is disengaged whereupon the first biasing means urges the yoke to the second position and both movable members to their inoperative positions.

5. Apparatus in accordance with claim 1 further including drive means to effect rotation of the xerographic drum and the fusing means when xerographic reproductions are being made, and means operatively connected to said drive means effective to cause said activating means to move to its first position when xerographic reproductions are to be made and to its second position when xerographic reproductions are not to be made.

6. Apparatus in accordance with claim 2 further including drive means to effect rotation of the xerographic drum and the fusing means when xerographic reproductions are being made, and means operatively connected to said drive means effective to cause said activating means to move to its first position when xerographic reproductions are to be made and to its second position when xerographic reproductions are not to be made.

No references cited.

EVON C. BLUNK, *Primary Examiner.*